(12) United States Patent
Goto et al.

(10) Patent No.: US 10,255,261 B2
(45) Date of Patent: Apr. 9, 2019

(54) METHOD AND APPARATUS FOR EXTRACTING AREAS

(71) Applicant: FUJITSU LIMITED, Kawasaki-shi, Kanagawa (JP)

(72) Inventors: Keisuke Goto, Kawasaki (JP); Yuiko Ohta, Kawasaki (JP); Hiroya Inakoshi, Tama (JP); Kento Uemura, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/424,495

(22) Filed: Feb. 3, 2017

(65) Prior Publication Data

US 2017/0286386 A1    Oct. 5, 2017

(30) Foreign Application Priority Data

Mar. 31, 2016  (JP) .................................. 2016-070011

(51) Int. Cl.
*G06F 17/00* (2006.01)
*G06F 17/24* (2006.01)
*G06T 7/11* (2017.01)

(52) U.S. Cl.
CPC .......... *G06F 17/245* (2013.01); *G06F 17/246* (2013.01); *G06F 17/247* (2013.01); *G06T 7/11* (2017.01)

(58) Field of Classification Search
CPC .... G06F 17/246; G06F 17/245–17/247; G06T 7/11
See application file for complete search history.

(56) References Cited

U.S. PATENT DOCUMENTS

| | | | | |
|---|---|---|---|---|
| 6,055,549 A | * | 4/2000 | Takano | ................. G06F 17/246 715/219 |
| 8,355,569 B2 | * | 1/2013 | Takahashi | ................. G06T 7/11 382/165 |

(Continued)

FOREIGN PATENT DOCUMENTS

| | | |
|---|---|---|
| JP | 11-175641 | 7/1999 |
| JP | 2005-216203 | 8/2005 |
| JP | 2010-079379 | 4/2010 |

OTHER PUBLICATIONS

Zhe Chen et al., "Automatic Web Spreadsheet Data Extraction", Proceedings of the 3rd International Workshop on Semantic Search Over the Web, ACM, Aug. 30, 2013 (8 pages).

(Continued)

*Primary Examiner* — Chau T Nguyen
(74) *Attorney, Agent, or Firm* — Fujitsu Patent Center

(57) ABSTRACT

A processor obtains a table that contains numerical values or character strings in its cells. The processor then replaces each numerical value with a first constant value, and each character string with a second constant value. The two constant values have opposite signs. The processor generates area datasets each including first to third rectangular areas. The right side of the second rectangular area coincides with the left side of the first rectangular area. The bottom side of the third rectangular area coincides with the top side of the first rectangular area. With respect to each generated area dataset, the processor compares a sum of first and second constant values in the first rectangular area with a sum of first and second constant values in the second and third rectangular areas. The processor outputs at least one of the area datasets according to the comparison result.

5 Claims, 21 Drawing Sheets

(56) References Cited

U.S. PATENT DOCUMENTS

| | | | |
|---|---|---|---|
| 8,599,287 B2* | 12/2013 | Masuko | H04N 5/265 |
| | | | 348/239 |
| 2007/0174482 A1 | 7/2007 | Yajima | |
| 2013/0156306 A1* | 6/2013 | Masuko | H04N 1/3873 |
| | | | 382/164 |
| 2014/0156655 A1* | 6/2014 | Ito | G06Q 50/04 |
| | | | 707/731 |
| 2014/0184607 A1* | 7/2014 | Toyoshima | G06F 17/2765 |
| | | | 345/440 |
| 2016/0078584 A1* | 3/2016 | Song | G06L 7/0002 |
| | | | 382/100 |

OTHER PUBLICATIONS

Kuan-Yu Chen et al., "On the range maximum-sum segment query problem", Discrete Applied Mathematics, vol. 155, Issue 16, Oct. 1, 2007, pp. 2043-2052 (11 pages).

* cited by examiner

FIG. 4

TABLE 8 Trends of Social Security Expense by Function in 2004 to 2008

(unit: million yen)

| | 2004 | 2005 | 2006 | 2007 | 2008 |
|---|---|---|---|---|---|
| Social Security Expense | 85,866,002 | 87,782,748 | 89,109,794 | 91,430,462 | 94,084,824 |
| (i) For Old-age People | 42,822,083 | 43,604,210 | 44,661,789 | 45,790,008 | 47,264,934 |
| Cash Handouts | 37,188,028 | 37,825,636 | 38,712,106 | 39,680,915 | 40,880,430 |
| Retirement Annuity | 36,724,189 | 37,614,277 | 38,511,593 | 39,349,853 | 40,524,006 |
| Early Retirement Annuity | - | - | - | - | - |
| Blanket Cash Handout | 402,665 | 150,926 | 146,896 | 131,367 | 141,093 |
| Retirement (Old-age) Benefit | 61,174 | 60,434 | 53,617 | 199,695 | 215,331 |
| Other Cash Benefits | 5,634,055 | 5,778,574 | 5,949,684 | 6,109,092 | 6,384,503 |
| In-kind Handout | 6,252,736 | 6,368,386 | 6,447,860 | 6,575,538 | 6,629,783 |
| (ii) For Bereaved Families | 6,252,220 | 6,367,958 | 6,447,516 | 6,575,025 | 6,629,509 |
| Cash Handouts | 6,147,198 | 6,261,489 | 6,358,906 | 6,452,727 | 6,516,759 |
| Survivor's Pension | 11,431 | 12,228 | 12,443 | 13,102 | 13,854 |
| Blanket Cash Handout | - | - | - | - | - |
| Bereaved Family Benefit | 93,591 | 93,882 | 76,166 | 109,196 | 98,896 |
| Other Cash Benefits | 517 | 427 | 344 | 513 | 274 |
| In-kind Handouts | - | - | - | - | - |
| Burial Fee | 517 | 427 | 344 | 513 | 274 |
| Others | | | | | |

NUMERICAL TABLE 111
COLUMN HEADER AREA 111b
NUMERICAL VALUE MANAGEMENT AREA 111c
ROW HEADER AREA 111a

FIG. 5

112 NUMERICAL TABLE

| Brand code | Item | | | Unit | Price | |
|---|---|---|---|---|---|---|
| | Items | | | | Sep 2005 | Aug 2005 |
| Spec. No. | | | | Units | Sep 2005 | Aug 2005 |
| 3015 | House Rent (Public) | Houserent(public)* | | per month·3.3m² | ... | ... |
| 3505 | Electricity (Fuel-adjusted 1) | Electricity(fueladjustmentcharges1) | | per month | - | - |
| 3804 | Water (Water Meter Rent) | Watercharges(meterrent) | | per month | - | - |
| 3805 | Water (Excess Charge 3) | Watercharges(excesscharges3) | | per cubic meter | 171 | 171 |
| 3806 | Water (Excess Charge 4) | Watercharges(excesscharges4) | | per cubic meter | 212 | 212 |
| 4511 | Disposal (Basic Charge) | Sewagedisposalcharges* | | per incident | - | - |
| 4512 | Disposal (Per-usage Charge) | Sewagedisposalcharges* | | per incident | - | - |
| 4513 | Disposal (Per-family Charge) | Sewagedisposalcharges* | | per month | - | - |
| 4605 | Sewerage (Excess Charge 4) | Seweragecharges(excesscharges4) | | per cubic meter | - | - |
| 6213 | Hospitalization (National) | Hospitalcharges(national,hospitalcharges) | | per week | - | - |
| 6214 | Hospitalization (National, Delivery) | Hospitalcharges(national,chargesfordelivery) | | per incident | 167620 | 167620 |
| 6215 | Hospitalization (Public, Delivery) | Hospitalcharges(public,hospitalcharges) | | per incident | 155000 | 155000 |
| 6216 | Hospitalization (Public, Delivery) | Hospitalcharges(public,chargesfordelivery) | | per week | 170940 | 170940 |
| 7015 | Railway Pass (Student, 5km) | Railwayfares(excludingJR)* | | per incident | 81500 | 81500 |
| 7017 | Railway Pass (Commuter, 5km) | Railwayfares(excludingJR)* | | per month | - | - |

FIG. 6

112a NUMERICAL TABLE (AFTER REPLACEMENT)

| | | | | | | |
|---|---|---|---|---|---|---|
| -2 | | | | -2 | -2 | |
| | | | | | | |
| | -2 | -2 | | | | |
| | | | | | | |
| | | | | | -2 | -2 |
| -2 | | | | | | |
| -2 | | | | -2 | | |
| -2 | | | | | -2 | -2 |
| | | | | | | |
| 2 | -2 | -2 | | -2 | -2 | |
| 2 | -2 | -2 | | -2 | | -2 |
| 2 | -2 | -2 | | -2 | -2 | -2 |
| 2 | -2 | -2 | | -2 | 2 | 2 |
| 2 | -2 | -2 | | -2 | 2 | 2 |
| 2 | -2 | -2 | | -2 | -2 | -2 |
| 2 | -2 | -2 | | -2 | -2 | -2 |
| 2 | -2 | -2 | | -2 | -2 | -2 |
| 2 | -2 | -2 | | -2 | -2 | -2 |
| 2 | -2 | -2 | | -2 | 2 | 2 |
| 2 | -2 | -2 | | -2 | 2 | 2 |
| 2 | -2 | -2 | | -2 | 2 | 2 |
| 2 | -2 | -2 | | -2 | 2 | 2 |
| 2 | -2 | -2 | | -2 | -2 | -2 |
| 2 | -2 | -2 | | -2 | -2 | -2 |

FIG. 7     NUMERICAL TABLE (AFTER REPLACEMENT)

FIG. 8 NUMERICAL TABLE (AFTER REPLACEMENT)

FIG. 9

NUMERICAL TABLE (AFTER REPLACEMENT)

FIG. 10

112 NUMERICAL TABLE

| Brand code | Item | | Items | Unit | Price | |
|---|---|---|---|---|---|---|
| | | | | | Sep 2005 | Aug 2005 |
| Spec. No. | | | | Units | Sep 2005 | Aug 2005 |
| 3015 | House Rent (Public) | | Houserent(public)* | per month·3.3m² | ... | |
| 3505 | Electricity (Fuel-adjusted 1) | | Electricity(fueladjustmentcharges1) | per month | - | - |
| 3804 | Water (Water Meter Rent) | | Watercharges(meterrent) | per month | - | - |
| 3805 | Water (Excess Charge 3) | | Watercharges(excesscharges3) | per cubic meter | 171 | 171 |
| 3806 | Water (Excess Charge 4) | | Watercharges(excesscharges4) | per cubic meter | 212 | 212 |
| 4511 | Disposal (Basic Charge) | | Sewagedisposalcharges* | per incident | - | - |
| 4512 | Disposal (Per-usage Charge) | | Sewagedisposalcharges* | per incident | - | - |
| 4513 | Disposal (Per-family Charge) | | Sewagedisposalcharges* | per month | - | - |
| 4605 | Sewerage (Excess Charge 4) | | Seweragecharges(excesscharges4) | per cubic meter | - | - |
| 6213 | Hospitalization (National) | | Hospitalcharges(national,hospitalcharges) | per week | 167620 | 167620 |
| 6214 | Hospitalization (National, Delivery) | | Hospitalcharges(national,chargesfordelivery) | per incident | 155000 | 155000 |
| 6215 | Hospitalization (Public, Delivery) | | Hospitalcharges(public,hospitalcharges) | per week | 170940 | 170940 |
| 6216 | Hospitalization (Public, Delivery) | | Hospitalcharges(public,chargesfordelivery) | per incident | 81500 | 81500 |
| 7015 | Railway Pass (Student, 5km) | | Railwayfares(excludingJR)* | per month | - | - |
| 7017 | Railway Pass (Commuter, 5km) | | Railwayfares(excludingJR)* | per month | - | - |

Method for obtaining a range in linear array that maximizes sum of elements (Theorem 1)

Obtain e that maximizes the sum of elements A[s..e] of linear array A[1..n], in preprocessing time of O(n) plus query time of O(1).

Range of e

FIG. 14

Method for obtaining an area in two-dimensional array A that minimizes sum of elements (Theorem 2)

Obtain right side (rs, ce)-(re, ce) that minimizes the sum of elements in a rectangle with given left side (rs, cs)-(re, cs), in preprocessing time of $O(n^3)$ plus query time of $O(1)$.

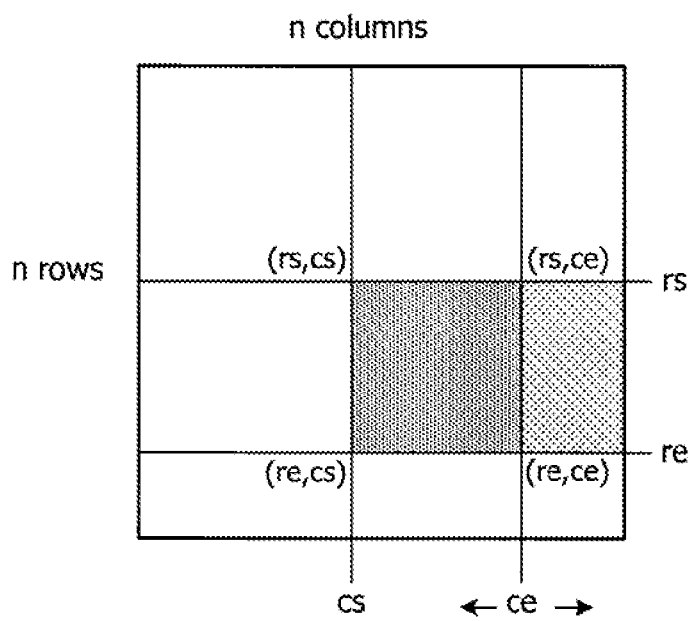

PREPROCESSING $$D[rs][re][c] = -\Sigma_{rs \leq r \leq re} A[r][c]$$

Apply preprocessing of Theorem 1 to a linear array of n elements D[rs][re][1], D[rs][re][2], ... D[rs][re][n] with various combinations of rs and re.

QUERY

Obtain ce that maximizes the sum of D[rs][re][cs..ce], where rs, re, and cs are given.

FIG. 15

Method for Calculating row_area(C)
(Theorem 3)

Obtain left side (rs, cs)-(re, cs) that minimizes the sum of elements in a rectangle with fixed right side (rs, ce)-(re, ce), in preprocessing time of $O(n^3)$ plus query time of $O(1)$.

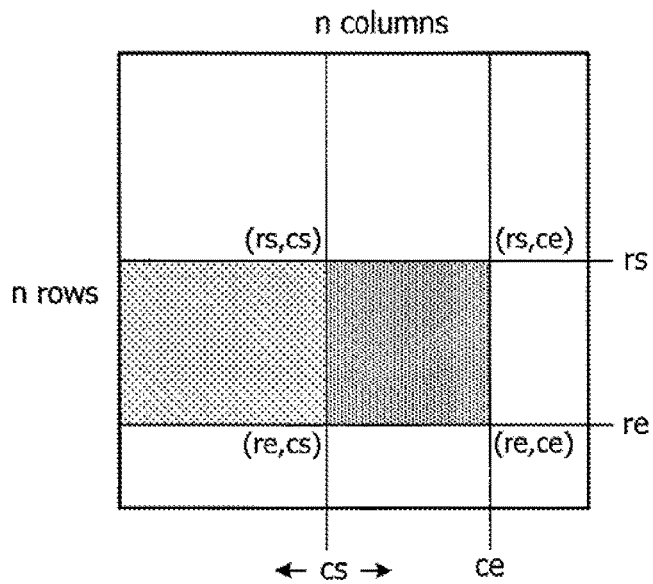

PREPROCESSING $$D[rs][re][c] = -\Sigma_{rs \leq r \leq re} A[r][c]$$

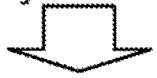

Apply preprocessing of Theorem 1 to a linear array of n elements D[rs][re][n], D[rs][re][n-1], ... D[rs][re][1] with various combinations of rs and re.

QUERY

Obtain cs that maximizes the sum of
D[rs][re][n-ce+1], D[rs][re][n-ce], ... D[rs][re][n-cs+1],
where rs, re, and cs are given.

FIG. 16

Method for calculating col_area(C)
(Theorem 4)

Obtain top side (rs, cs)-(rs, ce) that minimizes the sum of elements in a rectangle with fixed bottom side (re, cs)-(re, ce), in preprocessing time of $O(n^3)$ plus query time of $O(1)$.

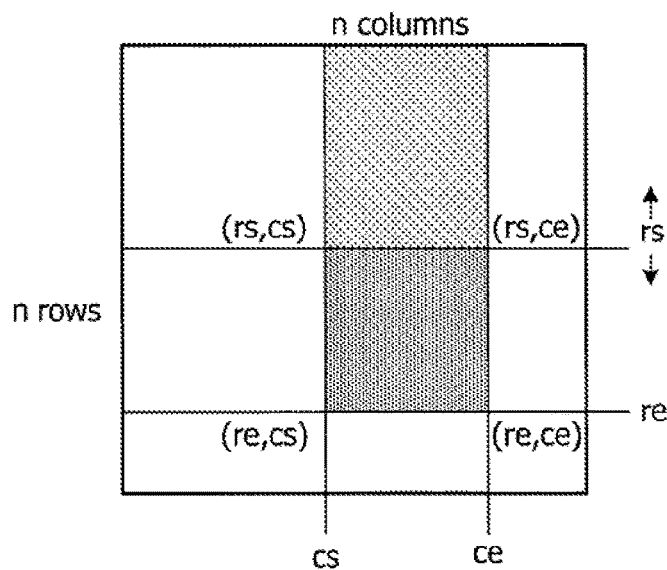

PREPROCESSING $$D_2[cs][ce][r] = -\Sigma_{cs \leq c \leq ce} A[r][c]$$

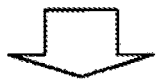

Apply preprocessing of Theorem 1 to a linear array of n elements $D_2[cs][ce][n]$, $D_2[cs][ce][n-1]$, ... $D_2[cs][ce][1]$ with various combinations of cs and ce.

QUERY

Obtain rs that maximizes the sum of
$D_2[cs][ce][n-re+1]$, $D_2[cs][ce][n-re]$, ... $D_2[cs][ce][n-rs+1]$,
where cs, ce, and re are given.

FIG. 17

Method for Calculating Sum of Elements in Rectangle
(Theorem 5)

Calculate the sum of elements in a rectangle (rs, re, cs, ce), as part of n x n two-dimensional array A, in preprocessing time of $O(n^3)$ plus query time of $O(1)$.

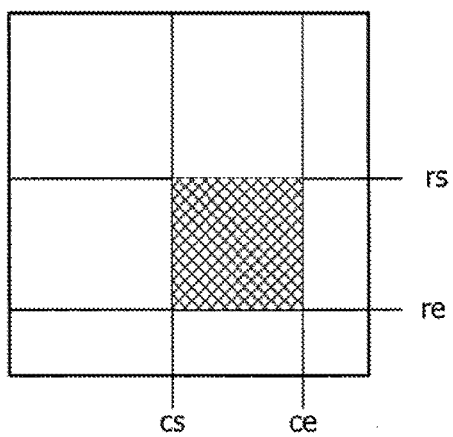

PREPROCESSING

$$E[rs][re][c] = \Sigma_{1 \leq i \leq c} D[rs][re][i]$$

SUMMATION

$$\Sigma_{rs \leq r \leq re, cs \leq c \leq ce} A[r][c]$$
$$= -\Sigma_{cs \leq c \leq ce} D[rs][re][c]$$
$$= -(E[rs][re][ce] - E[rs][re][cs-1])$$

METHOD AND APPARATUS FOR EXTRACTING AREAS

CROSS-REFERENCE TO RELATED APPLICATION

This application is based upon and claims the benefit of priority of the prior Japanese Patent Application No. 2016-070011, filed on Mar. 31, 2016, the entire contents of which are incorporated herein by reference.

FIELD

The embodiments discussed herein relate to a method and apparatus for extracting areas.

BACKGROUND

Computer systems store and manage many business-related numerical values in the form of tabular data structures. The term "numerical table" is used herein to refer to a tabular dataset that holds such numerical values. Typical numerical tables are formed from a numerical value management area and one or more header areas. The numerical value management area stores numerical values being managed, and the header areas describe of what items these numerical values are. In other words, the numerical value management area stores numerical values of items indicated by the header areas.

Numerical values stored in numerical tables may be used for the purpose of data mining. For example, a data mining process may take place to analyze many numerical tables that accumulate a large amount of sales records of specific products, so that some statistics (e.g., trend of sales) can be obtained. In this case, the process involves the task of demarcating header areas and numerical value management areas in each source numerical table. Such demarcation tasks may be done by human workers, but this solution is not realistic when there are a large number of numerical tables.

In view of the above, several techniques are proposed for automatically determining areas in a numerical table. For example, one proposed method produces documents as an output of document data stored in a database in tabular form. A document generation device implementing this method is also proposed. Another proposed method enables automatic extraction of relational data from spreadsheets.

Numerical tables may be analyzed in some other situations to find an area that satisfies specified conditions about numerical values in the tables. In this connection, one proposed method is designed to obtain an area that maximizes the sum of numerical values within a given array.

See, for example, the following documents:

Japanese Laid-open Patent Publication No. 11-175641

Zhe Chen, Michael Cafarella, "Automatic web spreadsheet data extraction", SS@'13 Proceedings of the 3rd International Workshop on Semantic Search Over the Web, ACM, 2013-08-30

Kuan-Yu Chen, Kun-Mao Chao, "On the range maximum-sum segment query problem", Discrete Applied Mathematics, 1 Oct. 2007, Volume 155, Issue 16, Pages 2043-2052

Most numerical tables use their numerical value management areas for the sole purpose of containing numerical values, but some numerical tables include other kinds of data in their counterparts. Similarly, the header areas may include numerical values as well. The conventional techniques are, however, unable to extract numerical value management areas properly if some of their cells contain character strings. The conventional techniques may also fail to extract header areas properly if some of their cells contain numerical values.

SUMMARY

In one aspect of the embodiments discussed herein, there is provided a non-transitory computer-readable storage medium storing a program, wherein the program causes a computer to perform a procedure including: obtaining a table in which a plurality of cells are arranged in rectangular form, at least some of the plurality of cells having numerical values or character strings; replacing each of the numerical values in the table with a first constant value, and each of the character strings in the table with a second constant value whose sign is opposite to a sign of the first constant value; generating a plurality of area datasets each including first to third rectangular areas, the first rectangular area having a top side and a left side, the second rectangular area having a right side that coincides with the left side of the first rectangular area, the third rectangular area having a bottom side that coincides with the top side of the first rectangular area, the plurality of area datasets respectively including different first rectangular areas; comparing a first sum with a second sum with respect to each of the generated area datasets, the first sum being a sum of first constant values and second constant values contained in cells of the first rectangular area, the second sum being a sum of first constant values and second constant values contained in cells of the second rectangular area and in cells of the third rectangular area; and outputting at least one of the plurality of area datasets, based on a result of the comparing.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 illustrates an example of a numerical table;

FIG. 5 illustrates an example of a numerical table to be subjected to area determination;

FIG. 6 illustrates an example of a numerical table after replacement of cell values;

FIG. 7 illustrates a first exemplary combination of rectangles;

FIG. 8 illustrates a second exemplary combination of rectangles;

FIG. 9 illustrates a third exemplary combination of rectangles;

FIG. 10 illustrates an exemplary screenshot of score-maximizing rectangles;

FIG. 14 illustrates a method (Theorem 2) for obtaining an area in a two-dimensional array that minimizes the sum of elements;

FIG. 15 illustrates a method (Theorem 3) for calculating row_area(C);

FIG. 16 illustrates a method (Theorem 4) for calculating col_area(C);

FIG. 17 illustrates a general method (Theorem 5) for calculating a sum of elements in a rectangle;

DESCRIPTION OF EMBODIMENTS

Several embodiments will be described below with reference to the accompanying drawings. These embodiments may be combined with each other, unless they have contradictory features.

(a) First Embodiment

Figure 1:
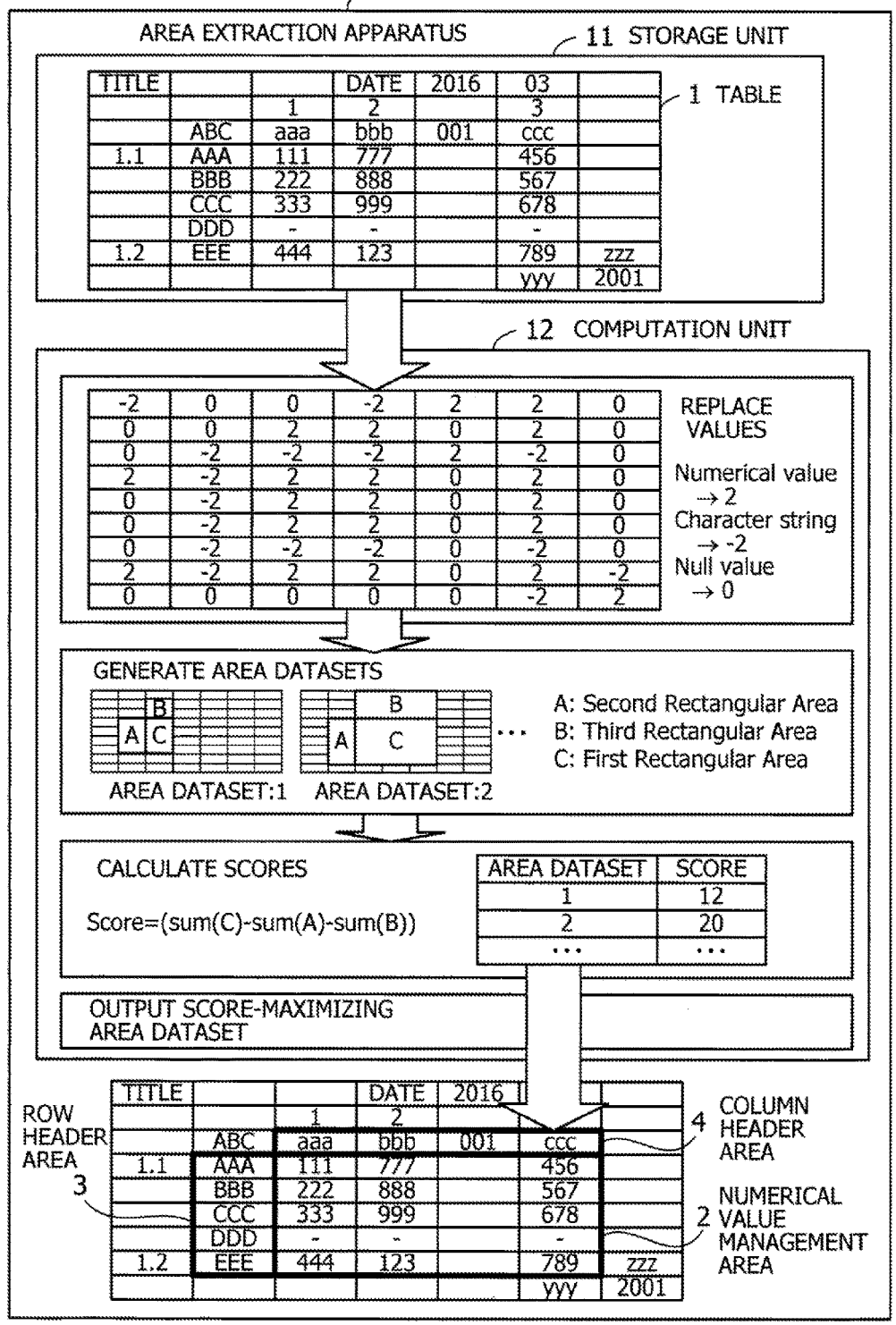
FIG. 1 illustrates an exemplary configuration of an area extraction apparatus according to a first embodiment.

FIG. 1 illustrates an exemplary configuration of an area extraction apparatus according to a first embodiment. The illustrated area extraction apparatus 10 includes a storage unit 11 and a computation unit 12.

The storage unit 11 is configured to store therein a table 1 formed from a plurality of cells arranged in horizontal and vertical directions within a rectangular space. The table 1 includes a row header area, a column header area, and a numerical value management area. The cells in the numerical value management area contains numerical values as its main constituent elements. It is assumed that none of these three areas in the table are known at the time of entry of the table 1 to the storage unit 11.

In the row header area, at least some of the cells hold character strings. The same is true in the column header area. Each individual cell in the numerical value management area is associated with a combination of two character strings in two cells in the row and column header areas, one on the corresponding row and the other on the corresponding column. At least some of those cells in the numerical value management area have a numerical value relating to their associated character strings. For example, the table 1 in FIG. 1 represents records of daily sales at different stores, in which the cells in its row header area indicate store names and those in its column header area indicate dates. In this case, a cell in a specific row and column of the numerical value management area contains a numerical value indicating the amount of sales that was made at the store corresponding to the row, on the date corresponding to the column.

The computation unit 12 analyzes the table 1 to extract its row header area, column header area, and numerical value management area. For example, the computation unit 12 replaces each numerical value in the table 1 with a first constant value, as well as each character string in the table 1 with a second constant value. Note that the first and second constant values have opposite signs. The computation unit 12 may further assign a third constant value to cells having no particular values (referred to as "empty" cells or "null-valued" cells). For example, the computation unit 12 may be configured to replace numerical values with a first constant value of 2 and character strings with a second constant value of −2, and assigns a value of zero to null-valued cells.

The computation unit 12 then generates a plurality of area datasets, each including a first rectangular area (area C), a second rectangular area (area A), and a third rectangular area (area B), by varying the lengths of top and left sides of the first rectangular area within the table 1. Here, the second rectangular area has a right side that the left side of the first rectangular area, and the third rectangular area has a bottom side that coincides with the upper side of the first rectangular area.

Then, with respect to each of the generated area datasets, the computation unit 12 calculates a sum of first constant values and second constant values in cells within the first rectangular area. This sum is referred to as a "first sum." The computation unit 12 also calculates a sum of first constant values and second constant values in cells within the second rectangular area and third rectangular area. This sum is referred to as a "second sum." The computation unit 12 now compares the first sum with the second sum in each different area dataset. For example, the computation unit 12 calculates a difference between the first sum and second sum and uses the difference as a "score" of the area dataset.

Think of, for example, a specific area dataset of first to third rectangular areas. Let the symbol sum(C) represent a sum of first and second constant values in cells within the first rectangular area. Also, let the symbol sum(A) represent a sum of first and second constant values in cells within the second rectangular area. Further, let the symbol sum(B) represent a sum of first and second constant values in cells within the third rectangular area. The first and second constant values amount to sum(A)+sum(B) in the second and third rectangular areas. The score of the area dataset of interest is expressed as: Score=sum(C)−sum(A)−sum(B).

The computation unit 12 selects and outputs at least one of the area datasets, based on the comparison result between first and second sums in each area dataset. For example, the computation unit 12 calculates scores of all area datasets and then investigates which of those area datasets gives a maximum difference (i.e., maximum score). The computation unit 12 outputs the maximum-difference area dataset by, for example, drawing its constituent three rectangular areas (i.e., first to third rectangular areas) over the table 1 on a display screen. Here, the first rectangular area in the table 1 indicates the numerical value management area 2, the second rectangular area indicates the row header area 3, and the third rectangular area indicates the column header area 4.

Some cells in a table store numerical values while other cells store character strings. The above-described area extraction apparatus 10 discovers a numerical value management area that includes more numerical-value cells than character-string cells. The area extraction apparatus 10 also discovers a row header area as an adjacent area that is located to the left of the numerical value management area and has more character-string cells than numerical-value cells. The area extraction apparatus 10 further discovers a column header area as an adjacent area that is located on top of the numerical value management area and has more character-string cells than numerical-value cells. The proposed method implemented in the area extraction apparatus 10 enables proper demarcation of a numerical value management area, row header area, and column header area even if these areas have both numerical values and character strings.

The computation unit 12 keeps away from worthless area datasets by taking constant values in their cells into consideration. For example, the computation unit 12 generates two or more rectangular areas whose right sides coincide with the left side of a determined first rectangular area and uses the generated rectangular areas as candidates for a second rectangular area. The computation unit 12 calculates the sum of first and second constant values in each candidate and selects one candidate whose sum of constant values has the same sign as the second constant value and exhibits the largest absolute value. In this way, the computation unit 12 determines the second rectangular area adjacent to the first rectangular area.

The computation unit 12 similarly generates two or more rectangular areas whose bottom sides coincide with the top side of the determined first rectangular area and uses the generated rectangular areas as candidates for a third rectangular area. The computation unit 12 calculates the sum of first and second constant values in the cells of each such candidate and selects one candidate whose sum of constant values has the same sign as the second constant value and exhibits the largest absolute value. In this way, the computation unit 12 determines the third rectangular area adjacent to the first rectangular area. The first rectangular area and the determined second, and third rectangular areas constitute one area dataset.

The above-described method determines a first rectangular area, and then a second rectangular area on the basis of the left side of the first rectangular area, as well as a third rectangular area on the basis of the top side of the first rectangular area. These three rectangular areas constitute a single area dataset. The method thus reduces the number of area datasets, mitigating subsequent burden of score calculation. It is therefore possible to improve the efficiency of the area extraction process as a whole.

The proposed method may modify the third constant value used to replace empty cells in the table 1, so as to enhance the reliability of areas that are determined. Suppose, for example, that some cells in the numerical value management area are empty in their original state. In this case, the third constant value may be set to a value whose sign is the same as the sign of the first constant value and whose absolute magnitude is greater than zero. For example, the third constant value may be set to one. This selection of the third constant value gives a raised score to the numerical value management area even if it has null-valued cells, thus improving the accuracy of area extraction. As another example, numerical values in a numerical value management area may be organized in pairs (e.g., vertically adjacent cells having a pair of numerical values). For example, one table may use two consecutive rows to indicate the amount of monthly sales, together with the ratio of monthly sales to the same month of the previous year, the former in the upper row and the latter in the lower row. The row header area of such a table may include the name of a month, not in both the two consecutive rows, but only in one of the two rows. When this is the case, it would be appropriate to select a value whose sign is the same as the sign of the second constant value and whose absolute magnitude is greater than zero. For example, the third constant value may be set to −1, so as to improve the accuracy of area extraction.

For example, the computation unit 12 of the first embodiment may be implemented as part of the functions provided by a processor in the area extraction apparatus 10. The storage unit 11 may be implemented as part of a memory or storage device in the area extraction apparatus 10.

(b) Second Embodiment

A second embodiment will now be described below. This second embodiment is configured to perform extraction of a row header area, column header area, and numerical value management area from a table in a more efficient manner. In the rest of this description, the term "header areas" may be used to refer to both a row header area and a column header area.

Figure 2:
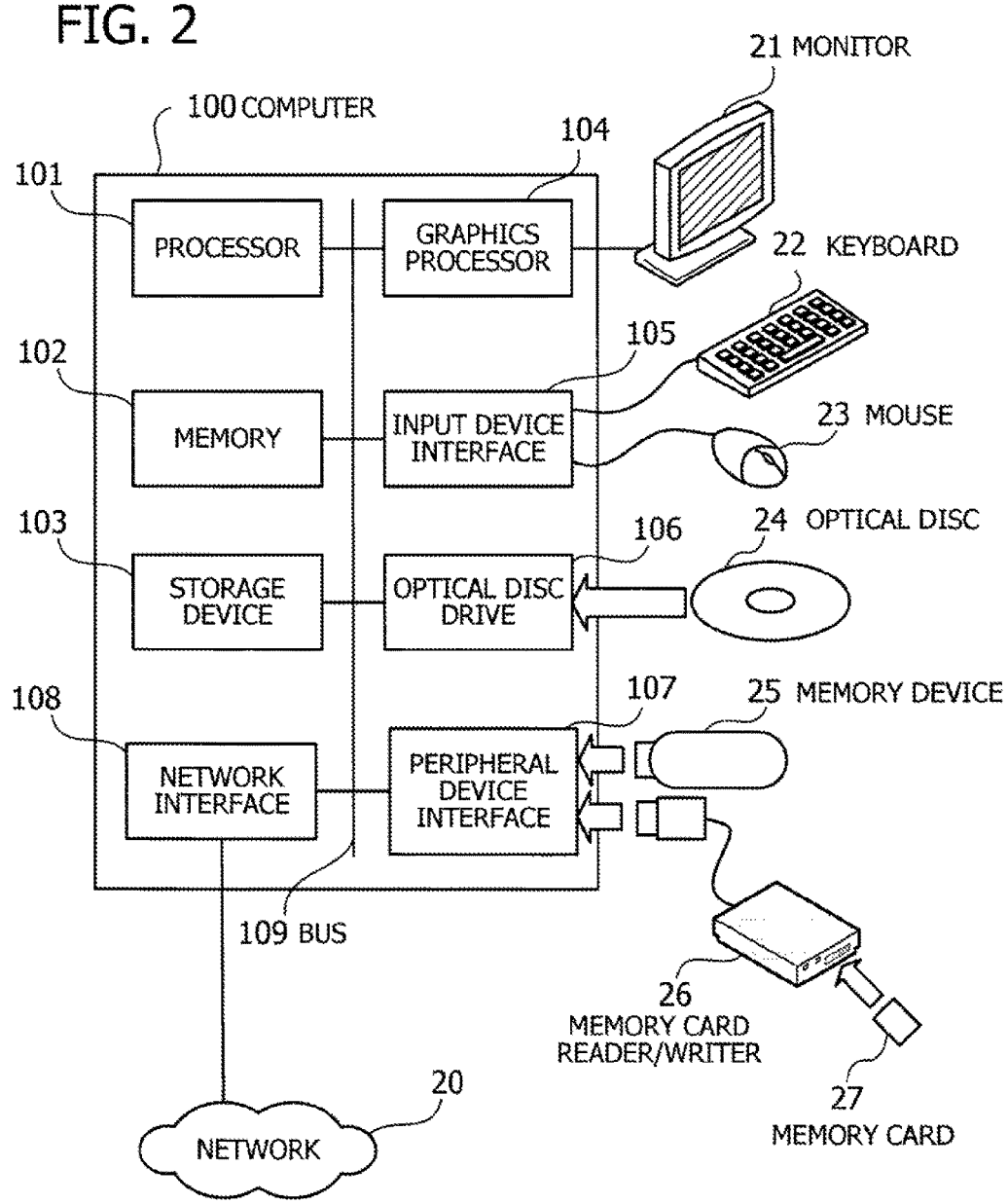
FIG. 2 illustrates an exemplary hardware configuration of a computer used in a second embodiment.

FIG. 2 illustrates an exemplary hardware configuration of a computer used in the second embodiment. The illustrated computer 100 includes a processor 101 to control its entire operation. The processor 101 is connected to a memory 102 and other various devices and interfaces on a bus 109. The processor 101 may be a single processing device or a multiprocessor system including two or more processing devices, such as a central processing unit (CPU), micro processing unit (MPU), or digital signal processor (DSP). It is also possible to implement processing functions of the processor 101 and its programs wholly or partly with an application-specific integrated circuit (ASIC), programmable logic device (PLD), or other electronic circuits, or any combination of them.

The memory 102 serves as the primary storage device of the computer 100. Specifically, the memory 102 is used to temporarily store at least some of the operating system (OS) programs and application programs that the processor 101 executes, as well as other various data objects that it manipulates at runtime. For example, the memory 102 may be implemented by using volatile semiconductor memory devices such as a random access memory (RAM).

Other devices on the bus 109 include a storage device 103, a graphics processor 104, an input device interface 105, an optical disc drive 106, a peripheral device interface 107, and a network interface 108.

The storage device 103 writes and reads data electrically or magnetically in or on its internal storage medium. The storage device 103 serves as a secondary storage device of the computer 100 to store program and data files of the operating system and applications. For example, the storage device 103 may be implemented by using a hard disk drive (HDD) or a solid state drive (SSD).

The graphics processor 104, coupled to a monitor 21, produces video images in accordance with drawing commands from the processor 101 and displays them on a screen of the monitor 21. The monitor 21 may be, for example, a cathode ray tube (CRT) display or a liquid crystal display.

The input device interface 105 is connected to input devices such as a keyboard 22 and a mouse 23 and supplies signals from those devices to the processor 101. The mouse 23 is a pointing device, which may be replaced with other kind of pointing devices, such as a touchscreen, tablet, touchpad, and trackball.

The optical disc drive 106 reads out data encoded on an optical disc 24, by using laser light. The optical disc 24 is a portable data storage medium, the data recorded on which can be read as a reflection of light or the lack of the same. For example, the optical disc 24 may be a digital versatile disc (DVD), DVD-RAM, compact disc read-only memory (CD-ROM), CD-Recordable (CD-R), or CD-Rewritable (CD-RW).

The peripheral device interface 107 is a communication interface used to connect peripheral devices to the computer 100. For example, the peripheral device interface 107 may be used to connect a memory device 25 and a memory card reader/writer 26. The memory device 25 is a data storage medium having a capability to communicate with the peripheral device interface 107. The memory card reader/writer 26 is an adapter used to write data to or read data from a memory card 27, which is a data storage medium in the form of a small card.

The network interface 108 is connected to a network 20 so as to exchange data with other computers or network devices (not illustrated).

The above-described hardware platform may be used to implement the processing functions of the second embodiment. The same hardware configuration of the computer 100 of FIG. 2 may similarly be applied to the foregoing area extraction apparatus 10 of the first embodiment.

The computer 100 provides various processing functions of the second embodiment by executing computer programs stored in a computer-readable storage medium. A variety of storage media are available for these computer programs. For example, the computer 100 may store program files in its storage device 103. The processor 101 reads out at least part of the programs stored in the storage device 103, loads them into the memory 102, and executes the loaded programs. Other possible storage locations for the programs include optical discs 24, memory devices 25, memory cards 27, and other portable storage media. The programs stored in a portable storage medium are installed in the storage device 103 under the control of the processor 101, so that they are ready to execute upon request. It may also be possible for the processor 101 to execute program codes read out of a portable storage medium, without installing them in its local storage devices.

The next part of description will explain what functions the proposed computer 100 includes to determine header areas and a numerical value management area in a numerical table.

Figure 3:
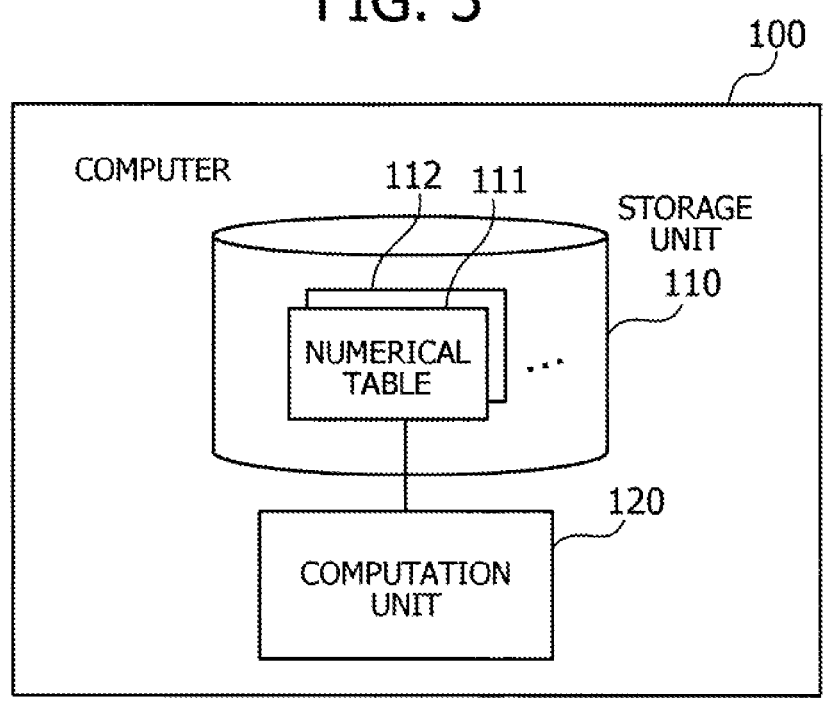
FIG. 3 is a block diagram illustrating functions of the proposed computer.

FIG. 3 is a block diagram illustrating functions of the proposed computer. The illustrated computer 100 includes a storage unit 110 and a computation unit 120. The storage unit 110 stores therein a numerical table 111. For example, the storage unit 110 is implemented as part of the memory 102 or storage device 103 discussed in FIG. 2.

The computation unit 120 determines header areas and a numerical value management area in a numerical table 111 and outputs information indicating these three areas. For example, the computation unit 120 is implemented as part of the functions that the processor 101 provides by executing programs.

The numerical table 111 stored in the storage unit 110 is organized as follows. FIG. 4 illustrates an example of a numerical table. As seen, the numerical table 111 in the storage unit 110 is formed from a plurality of cells divided by mesh lines. Note that the numerical table 111 seen in FIG. 4 partly omits mesh lines demarcating the cells. At least some of those cells have a character string or a numerical value.

The numerical table 111 has a row header area 111a, a column header area 111b, and a numerical value management area 111c. Each of these three areas has a rectangular shape and accommodates a plurality of cells. The cells in the row header area 111a contain information that describes what kind of values are seen in individual rows of the numerical value management area 111c. The cells in the column header area 111b contain information that describes what kind of values (i.e., items) are seen in individual column of the numerical value management area 111c. The cells in the numerical value management area 111c contain numerical data and the like relating to the combination of such items indicated by the corresponding row and column.

The row header area 111a and column header area 111b are supposed to meet the following conditions as to the numerical value management area 111c.

[Condition #1] The right side of the row header area 111a touches the left side of the numerical value management area 111c, and these two sides are the same in length.

[Condition #2] The bottom side of the column header area 111b touches the top side of the numerical value management area 111c, and these two sides are the same in length.

The above conditions #1 and #2 are referred to herein as the "output conditions."

The user may be able to manually specify the row header area 111a, column header area 111b, and numerical value management area 111c in one numerical table 111 or two. However, it would be too burdensome for him or her to do it for hundreds or thousands of such numerical tables 111. The second embodiment therefore proposes automated area determination with a computer 100.

If it could be assumed that every table contains only character strings in its header cells, the computer 100 would be configured to identify the cells containing a character string and extract rectangular areas formed only from those cells as its row header area 111a and column header area 111b. If it could be assumed that every table contains only numerical values in its body, the computer 100 would be configured to identify the cells containing a numerical value and extract a largest rectangular area formed only from those cells as its numerical value management area 111c. In reality, however, some numerical tables include numerical cells in their header areas or character cells in their numerical value management areas. The hypothetical configurations of the computer 100 mentioned above would not be able to properly determine the row header area, column header area, or numerical value management area in such real-world numerical tables.

Some numerical tables have attribute information (e.g., indentation and font designation) that specifies appearance of the content of cells. While such attributes may be used for determining areas, it is not always possible to rely on them because other numerical tables lack the same.

In view of the above things, the proposed computer 100 according to the second embodiment is configured to replace numerical values, character strings, null-valued cells in a numerical table with their corresponding constant values with different signs (e.g., positive for numerical values, negative for character strings, and either for null value). The computer 100 then enumerates all possible combinations of a rectangle A representing a row header area, a rectangle B representing a column header area, and a rectangle C representing a numerical value management area. Out of those combinations, the computer 100 extracts and outputs a particular combination of rectangles A, B, and C that maximizes $g(A, B, C) = \mathrm{sum}(C) - \mathrm{sum}(A) - \mathrm{sum}(B)$.

The proposed method outputs rectangles having numerical values and character strings with consideration of balance between them, taking advantage of the tendency that header areas include more character strings while numerical value management areas include more numerical values. It is thus possible to obtain a proper numerical value management area and proper header areas even if the former includes some character strings and the latter include some numerical values. The algorithm is based on a quite simple fact that each cell contains a character string or a numerical value, or is otherwise null-valued (empty). Accordingly, the proposed method is applicable to a variety of numerical tables, including those without font designations or indentations in their header areas.

A specific example of area determination will now be described below. FIG. 5 illustrates an example of a numerical table to be subjected to area determination. Suppose here that this numerical table 112 of FIG. 5 is subjected to the computer 100 for area determination. In response, the computation unit 120 retrieves data of the numerical table 112 out of the storage unit 110. The computation unit 120 replaces the content of individual cells in the numerical table 112 with constant values, depending on whether they contain character strings or numerical values or null values. The constant values for this replacement were previously specified by the user.

FIG. 6 illustrates an example of a numerical table after replacement of cell values. In the example of FIG. 6, character strings have each been replaced with a constant value of −2, numerical values have each been replaced with a constant value of 2, and null values have each been replaced with a constant value of zero. For illustrative purposes, the numerical table 112a in FIG. 6 omits the zeros.

Based on the modified numerical table 112a, the computation unit 120 creates a list that enumerates all possible combinations of a rectangle A representing a row header area, a rectangle B representing a column header area, and a rectangle C representing a numerical value management area, where each of the combinations satisfies the foregoing output conditions. The rectangles A, B, and C are respectively referred to as a "row header rectangle," a "column header rectangle," and a "numerical area rectangle," as needed. During the course of this enumeration, the computation unit 120 calculates a score, g(A, B, C)=sum(C)−sum(A)−sum(B), of each combination of rectangles and keeps track of the largest score and its related rectangle A, B, and C. The function "sum( )" represents a sum of constant values that the cells in a specific area indicate.

Figure 7:
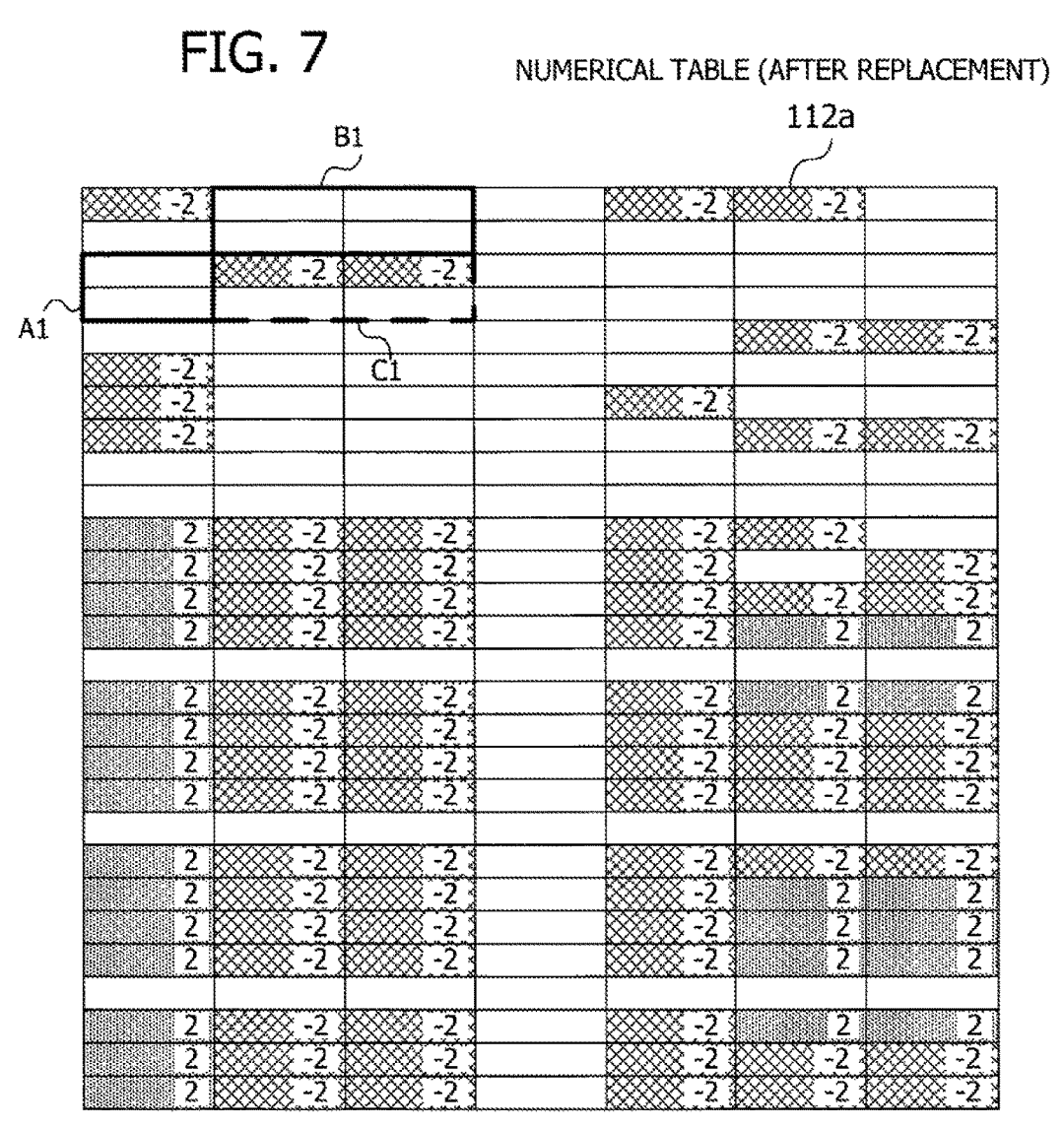

FIG. 7 illustrates a first exemplary combination of rectangles. The illustrated combination of FIG. 7 is formed from row header rectangle A1, column header rectangle B1, and numerical area rectangle C1. Suppose that the list records this combination of rectangles A1, B1, and C1 in the first place.

Row header rectangle A1 includes two cells having a constant value of zero (omitted in FIG. 7). Column header rectangle B1 includes four cells having a constant value of zero. Numerical area rectangle C1 includes four cells, two having a constant value of −2 and the other two having a constant value of zero.

The score of the above combination of rectangles A1, B1, and C1 is calculated as follows: g(A1, B1, C1)=sum(C1)−sum(A1)−sum(B1)=−4+0+0=−4. Since this combination is the first entry in the list, the record of maximum score at the moment is −4, and the record of related rectangles indicates the combination of A1, B1, and C1.

Figure 8:
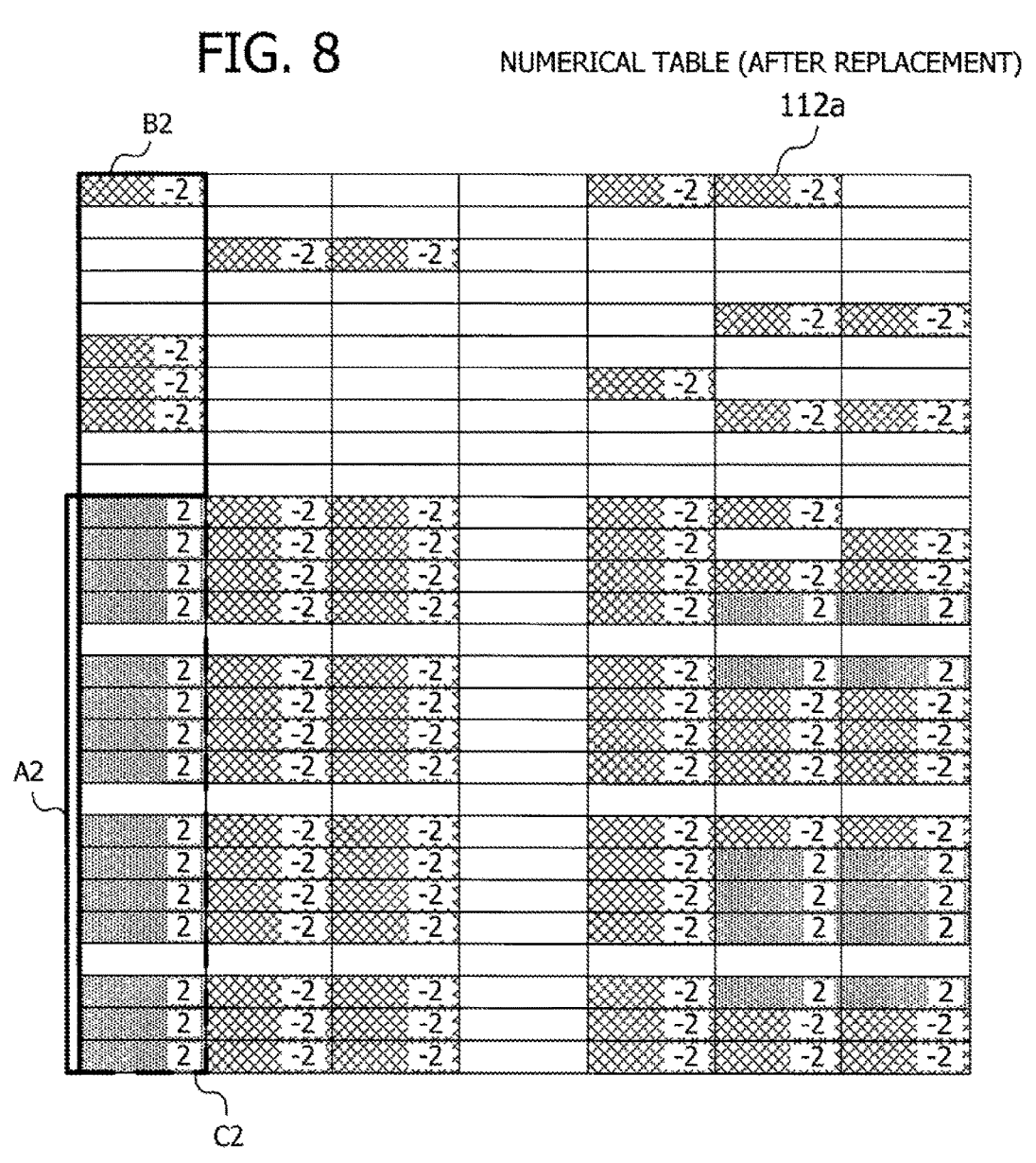

FIG. 8 illustrates a second exemplary combination of rectangles. The illustrated combination of FIG. 8 is formed from row header rectangle A2, column header rectangle B2, and numerical area rectangle C2. This combination of rectangles A2, B2, and C2 is added to the list, following the first combination of rectangles A1, B1, and C1 discussed in FIG. 7.

Row header rectangle A2 has a size of zero and includes no cells. Column header rectangle B2 includes ten cells in total, four having a constant value of −2 and six having a constant value of zero. Numerical area rectangle C2 includes eighteen cells in total, fifteen having a constant value of 2 and three having a constant value of zero.

The score of the above combination of rectangles A2, B2, and C2 is calculated as follows: g(A2, B2, C2)=sum(C2)−sum(A2)−sum(B2)=30+0+8=38. This score 38 is greater than the score −4 of the foregoing combination of rectangles A1, B1, and C1 in FIG. 7. The record of maximum score is updated to 38, as is the record of rectangles to A2, B2, and C2.

Figure 9:
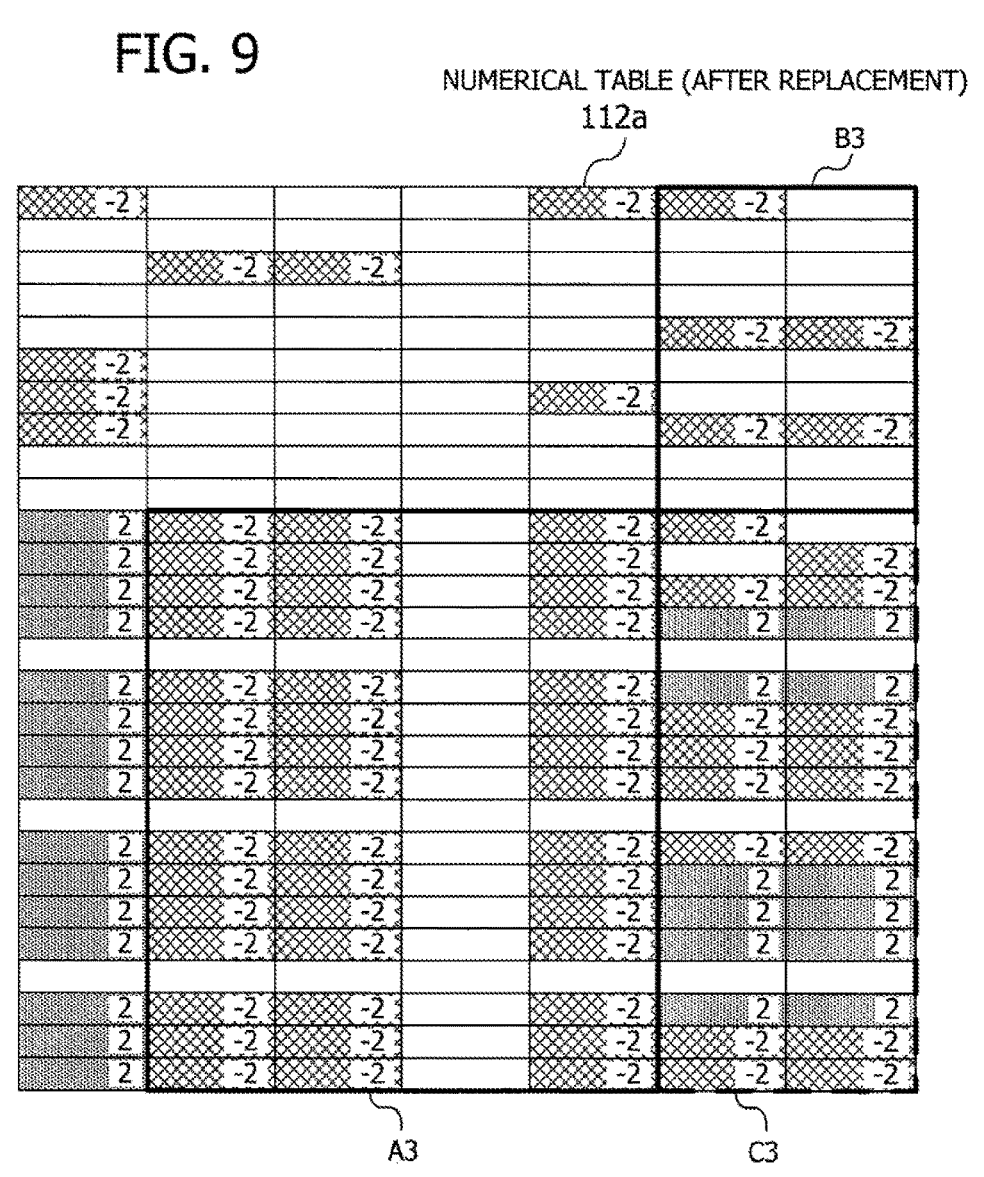

FIG. 9 illustrates a third exemplary combination of rectangles. The illustrated combination of FIG. 9 is formed from row header rectangle A3, column header rectangle B3, and numerical area rectangle C3. This combination of rectangles A3, B3, and C3 is added to the list, following the second combination of rectangles A2, B2, and C2 discussed in FIG. 8.

Row header rectangle A3 includes 72 cells in total, 45 having a constant value of −2 and 27 having a constant value of zero. Column header rectangle B3 includes 20 cells in total, five having a constant value of −2 and fifteen having a constant value of zero. Numerical area rectangle C3 includes 36 cells in total, twelve having a constant value of 2 and sixteen having a constant value of −2, and eight having a constant value of zero.

The score of the above combination of rectangles A3, B3, and C3 is calculated as follows: g(A3, B3, C3)=sum(C3)−sum(A3)−sum(B3)=−8+90+10=92. This score 92 is greater than the current maximum score 38. Accordingly, the record of maximum score is updated to 92, as is the record of rectangles to A3, B3, and C3.

The computation unit 120 further enumerates more combinations of rectangles that satisfy the foregoing output conditions and calculates their respective scores. Out of these combinations of rectangles, the computation unit 120 selectively outputs one combination that exhibits the largest score. This combination of rectangles is referred to as the "score-maximizing rectangles."

The final output in the example discussed above in FIGS. 7 to 9 is the combination of rectangles A3, B3, and C3. The computation unit 120 then draws these rectangles A3, B3, and C3 over the original numerical table 112 on a screen of the monitor 21.

FIG. 10 illustrates an exemplary screenshot of score-maximizing rectangles. Three rectangles A3, B3, and C3 are drawn with bold lines on top of the numerical table 112 as in FIG. 10, so that the determined row header area, column header area, and numerical value management area can be visually presented to the user.

Figure 11:
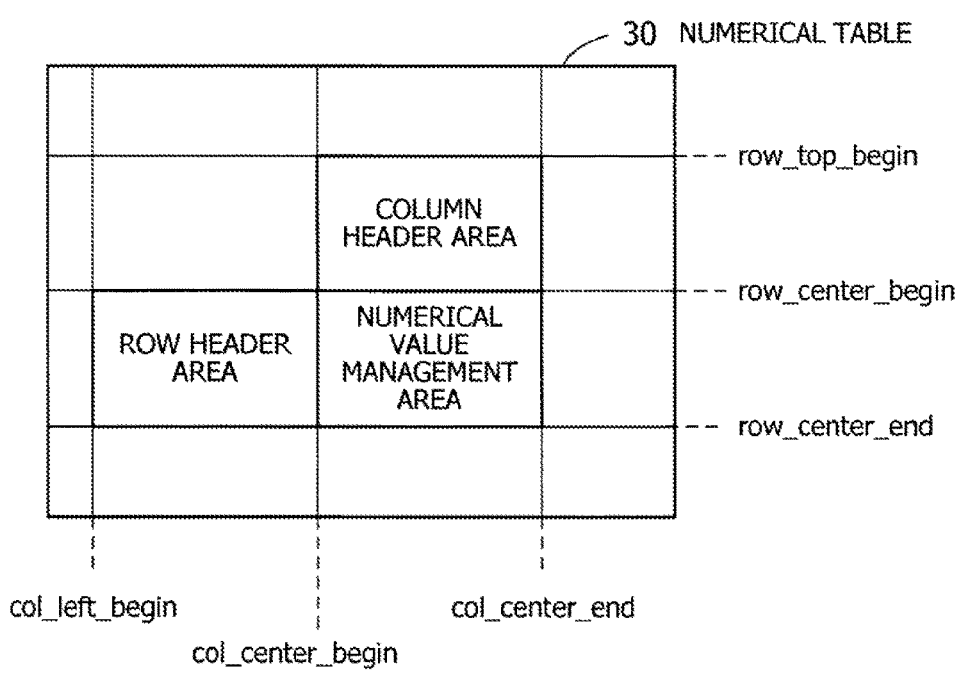
FIG. 11 illustrates variables used to identify three rectangles.

The description now turns to the issue of computation time for determining score-maximizing rectangles. FIG. 11 illustrates variables used to identify three rectangles. For example, the following four parameters will uniquely determine the position and dimensions of a specific rectangle in a numerical table 30: row number of top side, row number of bottom side, column number of left side, and column number of right side. Because of the foregoing output conditions, the three rectangles can be uniquely determined by six parameters representing three row positions (row_top_begin, row_center_begin, row_center_end) and three column positions (col_left_begin, col_center_begin, col_center_end). More specifically, variable row_top_begin indicates the top side position of the column header area. Variable row_center_begin indicates the top side position of the numerical value management area. Variable row_center_end indicates the bottom side position of the numerical value management area. Variable col_left_begin indicates the left side position of the row header area. Variable col_center_begin indicates the left side position of the numerical value management area. Variable col_center_end indicates the right side position of the numerical value management area.

The processing time for determining score-maximizing rectangles depends on the size of the numerical table 30 of interest. Suppose now that the numerical table has a size of n rows by n columns, where n is an integer greater than zero. Without special processing schemes, the task of enumerating all possible combinations of row header area, column header area, and numerical value management area takes a time of $O(n^6)$ in the big O notation, and the task of calculating their respective costs takes a time of $O(n^2)$. All in all, the determination process of score-maximizing rectangles consumes a time of $O(n^8)$.

As can be seen from the above, the computational complexity increases substantially as the size of the numerical table 30 grows, because of the explosion in the amount of computation. For this reason, the next section will discuss the issue of how to cut the computational complexity.

As mentioned above, the three rectangles in a numerical table are bound with each other. That is, the numerical area rectangle shares its one side with the column header rectangle and another side with the row header rectangle. These two sides of the numerical area rectangle have the same lengths as their respective counterparts of the column header rectangle and row header rectangle. Once a numerical area rectangle is fixed, its corresponding score-maximizing column header rectangle and row header rectangle can then be uniquely determined from the dimensions of the numerical area rectangle, by using the noted conditions. It also achieves reduction in the number of rectangle combinations and in the amount of computational work for evaluating their scores. The column header rectangle may maximize the score when the sum of its constant values hits a minimum point. Likewise, the row header rectangle may maximize the score when the sum of its constant values hits a minimum point.

Figure 12:
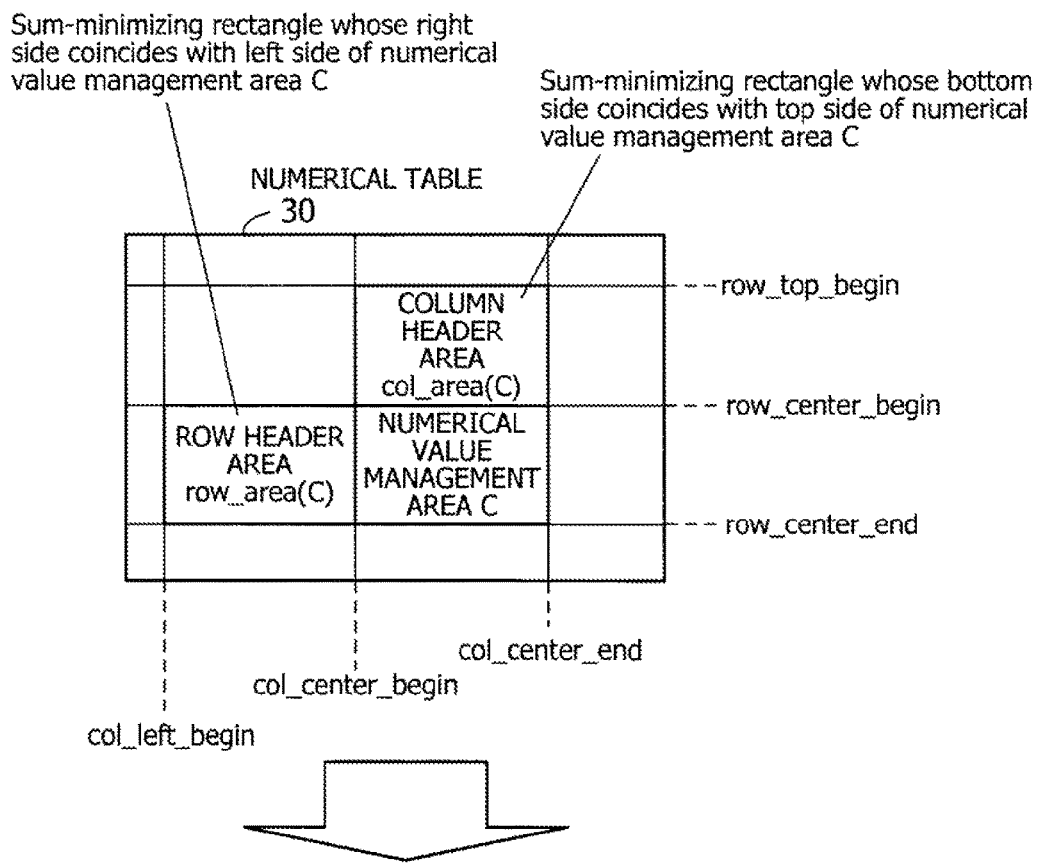
FIG. 12 illustrates a method for reducing computational complexity.

FIG. 12 illustrates a method for reducing computational complexity. The illustrated numerical area rectangle C in FIG. 12 is defined by the following four variables: row_center_begin, row_center_end, col_center_begin, and col_center_end. The left side of this numerical area rectangle C is also the right side of row header rectangle A. Accordingly, once numerical area rectangle C is established, three out of the four variables of row header rectangle A (i.e., row_center_begin, row_center_end, col_center_begin) are determined. The only remaining variable col_left_begin is determined by seeking an appropriate position for the left side of the row header area, such that the sum of constant values in the row header rectangle may be minimized. In other words, row header rectangle A is uniquely determined when numerical area rectangle C in the numerical table 30 is known. In view of this relationship with numerical area rectangle C, row header rectangle A is now represented as row_area(C).

The top side of numerical area rectangle C is also the bottom side of column header rectangle B. Accordingly, once numerical area rectangle C is established, three out of the four variables of column header rectangle B (i.e., row_center_begin, col_center_begin, col_center_end) are determined. The only remaining variable row_top_begin is determined by seeking an appropriate position for the top side of the column header area, such that the sum of constant values in the column header rectangle may be minimized. In other words, column header rectangle B is uniquely determined when numerical area rectangle C in the numerical table 30 is known. In view of this relationship with numerical area rectangle C, column header rectangle B is now represented as col_area(C).

The cost (score), g(A, B, C)=sum(C)−(sum(A)+sum(B)), in this case is thus rewritten as g'(C)=sum(C)−(sum(row_area(C))+sum(col_area(C))). Here the computer 100 seeks a rectangle C that maximizes g'(C), thereby obtaining an optimal combination of rectangles A, B, and C that maximizes g(A, B, C).

As described above, three rectangles A, B, and C that maximize g(A, B, C) are obtained by using C that maximizes g'(C). This calculation may be performed in the following steps, with a computational complexity of $O(n^4)$:

[Step 1] The computation unit 120 replaces individual cells in a given numerical table with constant values.

[Step 2] The computation unit 120 performs some preprocessing operations in preparation for subsequent calculation of sum(C), col_area(C), and row_area(C) for a possible rectangle C. The computational complexity of this preprocessing is $O(n^3)$ while that of the subsequent calculation is O(1).

[Step 3] The computation unit 120 enumerates all possible numerical area rectangles C. For example, the computation unit 120 enumerates all possible combinations of beginning row, beginning column, ending row, and ending column of numerical area rectangle C. This enumeration step has a computational complexity of $O(n^4)$.

[Step 4] In the above process of step 3, the computation unit 120 calculates a score, g'(C)=sum(C)−(sum(row_area(C))+sum(col_area(C))), of each found rectangle C and records the maximum score and its corresponding rectangle C. Calculation of sum(C) has a computational complexity of O(1). This is also true with each of row_area(C), sum(row_area(C)), col_area(C), and sum(col_area(C)).

[Step 5] The computation unit 120 outputs the score-maximizing rectangles row_area(C), col_area(C), and C. Computation for obtaining row_area(C) is O(1), as is that for col_area(C).

As can be seen from the above, the task of enumerating possible rectangles C needs the largest computational complexity, $O(n^4)$, meaning that the entire computation of the above process is done with a computational complexity of $O(n^4)$. The description will now provide details of the following two calculation methods:

(1) Method for calculating col_area(C) and row_area(C) in a preprocessing time of $O(n^3)$ plus a query time of O(1)

(2) Method for calculating a sum of elements in a rectangle in a preprocessing time of $O(n^3)$ plus a query time of O(1)

The explanation begins with how to calculate rectangles col_area(C) and row_area(C) in a preprocessing time of $O(n^3)$ plus a query time of O(1). This calculation actually uses two techniques. One technique is to calculate a range in a linear array that maximizes the sum of elements. The other technique is to calculate an area that minimizes the sum of elements in a two-dimensional array. The former technique will be referred to herein as "Theorem 1," and the latter technique is referred to herein as "Theorem 2."

Figure 13:
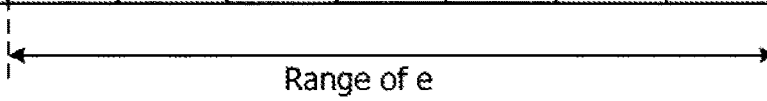
FIG. 13 illustrates a method (Theorem 1) for obtaining a range in a linear array that maximizes the sum of elements.

FIG. 13 illustrates a method (Theorem 1) for obtaining a range in a linear array that maximizes the sum of elements. Think of, for example, an array A[i], where i is an integer greater than zero. FIG. 13 gives the value of elements of this array A[i], assuming i=1, 2, 3, . . . , 8. Here the question is to obtain an integer e that maximizes the sum of elements A[2] to A[e], where e is between 2 and 8. In the example in FIG. 13, the sum of A[2] to A[e] hits the maximum point when e is 6.

For example, the above calculation may be achieved with a technique disclosed in a paper by Kuan-Yu Chen et al. (See the list of documents in the BACKGROUND section.) That paper describes why it is possible to calculate a value of e that maximizes the sum of elements A[s . . . e] in a linear array A[1 . . . n], in a preprocessing time of O(n) plus a query time of O(1).

The next section will now describe a technique of obtaining a sum-minimizing area in a two-dimensional array. FIG. 14 illustrates a method (Theorem 2) for obtaining an area in a two-dimensional array that minimizes the sum of elements. Think of, for example, an area in a numerical table composed of n rows and n columns. The top side and bottom side of this area are located in the rs-th and re-th rows, respectively. The left side and right side of the area are located in the cs-th and ce-th columns, respectively. Let the symbol A[r][c] represent a two-dimensional array of elements each indicating a constant value in the r-th row and c-th column, or (r, c). The left side of the area is thus represented as (rs, cs)–(re, cs), and the right side is represented as (rs, ce)–(re, ce). The question is to obtain the right side (rs, ce)–(re, ce) that minimizes the sum of constant values contained in the area, when the left side (rs, cs)–(re, cs) of the area is known.

Consider first the following three-dimensional array D:

$$D[rs][re][c] = -\Sigma_{rs \leq r \leq re} A[r][c] \quad (1)$$

This three-dimensional array D holds a collection of values calculated by summing up constant values in the cells from (row rs, column c) to (row re, column c) in the two-dimensional array A and reversing the sign of the resulting sum.

Theorem 2 includes a preprocessing operation that calculates the above three-dimensional array D, with respect to every possible combination of rs, re, and c. More specifically, the preprocessing operation calculates D[rs][re][1], D[rs][re][2], . . . , D[rs][re][n], thus obtaining the value of D for every possible combination of rs, re, and c. The details of this preprocessing operation are as follows.

Let us now introduce a two-dimensional array C that represents cumulative sums of the two-dimensional array A. That is, the element in the r-th row and c-th column represents the sum of elements in a range from (1, c) to (r, c). Specifically, this two-dimensional array C is expressed as follows:

$$C[r][c] = -\Sigma_{1 \leq i \leq r} A[i][c] \quad (2)$$

With the above two-dimensional array C, an equation C[r][c]=-A[r][c]+C[r-1][c] holds, where C[0][c]=0. The two-dimensional array C is obtained by calculating values of C[r][c] while varying r from 1 to n, with each possible value of c. This calculation has a computational complexity of $O(n^2)$.

Based on the values in the two-dimensional array C, the above three-dimensional array D can be obtained as follows:

$$D[rs][re][c] = -\Sigma_{rs \leq r \leq re} A[r][c] = C[re][c] - C[rs-1][c] \quad (3)$$

Accordingly, Theorem 2 is configured to calculate D[rs][re][c]=C[re][c]-C[rs-a][c] while varying c from 1 to n, with respect to all possible values of rs and re. The obtained series of values D[rs][re][1], D[rs][re][2], . . . , D[rs][re][n], being regarded as a linear array with a length of n, is subjected to the preprocessing operation according to Theorem 1.

The preprocessing operation in Theorem 2 is performed in the way described above. This preprocessing operation actually applies the process of Theorem 1, whose computational complexity is O(n), to as many linear arrays as $O(n^2)$. The computational complexity of the preprocessing operation thus amounts to $O(n^3)$.

A query is then entered with input parameters rs, re, and cs, triggering the remaining calculation for obtaining a sum-minimizing area in the two-dimensional array by using the result of the preprocessing operation. This calculation obtains ce that maximizes the sum of elements in a three-dimensional array D[rs][re][cs . . . ce] according to the given query, with a computational complexity of O(1). The details will now be described below.

The three-dimensional array D holds the sum of elements from the rs-th row to the re-th row in each column, with their respective signs reversed. The problem in question is, on the other hand, to obtain the right side of an area that minimizes the sum of constant values therein. This problem is solved by calculating an area that maximizes the sum of elements in the three-dimensional array D[rs][re][cs . . . ce]. The right side (i.e., variable ce indicating the right side) of that sum-maximizing area is obtained with a computational complexity of O(1) by using the preprocessing result of Theorem 1 applied to a linear array of D[rs][re][1], D[rs][re][2], . . . , D[rs][re][n]. Variable ce is calculated in this way, which demarcates an area that minimizes the sum of constant values therein.

Theorem 2 described above may also be used to calculate row header area row_area(C) and column header area col_area(C) seen in FIG. 12 in a more efficient way. The following section will now describe a method for calculating row_area (C) (referred to as Theorem 3) and a method for calculating col_area(C) (referred to as Theorem 4).

The description first explains Theorem 3. FIG. 15 illustrates a method (Theorem 3) for calculating row_area(C). Suppose that an area within an n×n two-dimensional array A has a known right side (rs, ce)–(re, ce). The question is to obtain its unknown left side (rs, cs)–(re, cs) that minimizes the sum of constant values contained in the area. This calculation can be performed in a preprocessing time of $O(n^3)$ plus an execution time of O(1) as will be demonstrated below.

The process begins with a preprocessing operation that calculates a three-dimensional array D discussed in equation (1), for each possible combination of rs, re, and c. This preprocessing operation uses the same calculation method described previously for Theorem 2. That is, Theorem 3 treats a series of elements in three-dimensional array D as a linear array, as in Theorem 2. Specifically, Theorem 2 treats a series of D[rs][re][1], D[rs][re][2], . . . , D[rs][re][n] as a linear array of n elements. Theorem 3 similarly treats the same as a linear array, but with an opposite order of elements, i.e., D[rs][re][n], D[rs][re][n-1], . . . , D[rs][re][1]. This array of n elements are then subjected to the preprocessing according to Theorem 1.

A query is then entered with input parameters rs, re, and ce, triggering the remaining calculation for obtaining a sum-minimizing area in the two-dimensional array by using the result of the above preprocessing operation. The problem in question is to obtain the left side of an area that minimizes the sum of constant values therein. This problem is solved by calculating first an area that maximizes the sum of elements, D[rs][re][n-ce+1], D[rs][re][n-ce], . . . , D[rs][re][n-cs+1], in the three-dimensional array D[rs][re][cs . . . ce]. Variable cs, indicating the left side of the sum-maximizing area, is obtained with a computational complexity of O(1) by using the preprocessing result of Theorem 1 applied to a linear array of D[rs][re][n], D[rs][re][n-1], . . . , D[rs][re][1].

Variable cs is calculated in this way, which demarcates an area that minimizes the sum of constant values therein.

The description now explains Theorem 4 to calculate col_area(C). FIG. 16 illustrates a method (Theorem 4) for calculating col_area(C). Suppose that an area within an n×n two-dimensional array A has a known bottom side (re, cs)–(re, ce). The question is to obtain its unknown top side (rs, cs)–(re, ce) that minimizes the sum of elements in the area. This calculation can be performed in a preprocessing time of $O(n^3)$ and an execution time of $O(1)$ as will be demonstrated below.

Consider first the following three-dimensional array $D_2$:

$$D_2[cs][ce][r] = -\Sigma_{cs \leq c \leq ce} A[r][c] \qquad (4)$$

This three-dimensional array $D_2$ holds a collection of values calculated by summing up constant values in the cells from (row r, column cs) to (row r, column ce) in the two-dimensional array A and reversing the sign of the resulting sum.

Theorem 4 includes a preprocessing operation that calculates the above three-dimensional array $D_2$, with respect to every possible combination of cs, ce, and r. More specifically, the preprocessing operation calculates $D_2[cs][ce][n]$, $D_2[cs][ce][n-1], \ldots, D_2[cs][ce][1]$, thus obtaining the value of $D_2$ for every possible combination of cs and ce. The obtained series of values $D_2[cs][ce][n]$, $D_2[cs][ce][n-1], \ldots, D_2[cs][ce][1]$, being regarded as a linear array with a length of n, is subjected to the preprocessing operation according to Theorem 1.

The preprocessing operation in Theorem 4 is performed in the way described above. This preprocessing operation actually applies the process of Theorem 1, whose computation is $O(n)$, to as many linear arrays as $O(n^2)$. The computational complexity of the preprocessing operation thus amounts to $O(n^3)$.

A query is then entered with input parameters cs, ce, and re, triggering the remaining calculation for obtaining a sum-minimizing area in the two-dimensional array by using the result of the preprocessing operation. The query poses a problem of obtaining variable rs that maximizes the sum of elements, $D_2[cs][ce][n-re+1], D_2[cs][ce][n-re], \ldots, D_2[cs][ce][n-rs+1]$, of the three-dimensional array $D_2$. This query is solved with a computational complexity of $O(1)$. The details will now be described below.

The three-dimensional array $D_2$ holds the sum of elements from the cs-th column to the ce-th column, in each row, with their respective signs reversed. The problem in question is, on the other hand, to obtain the top side of an area that minimizes the sum of constant values therein. This problem is solved by calculating first an area that maximizes the sum of elements in the three-dimensional array $D_2[cs][ce][rs \ldots re]$. Variable rs of that sum-maximizing area is obtained with a computational complexity of $O(1)$ by using the preprocessing result of Theorem 1 applied to a linear array of $D_2[cs][ce][n-re+1], D_2[cs][ce][n-re], \ldots, D_2[cs][ce][n-rs+1]$. Variable rs is calculated in this way, which demarcates an area that minimizes the sum of constant values therein.

Methods for calculating col_area(C) and row_area (C) in a preprocessing time of $O(n^3)$ plus a query time of $O(1)$ have been described above. The next section presents a method of calculating the sum of elements in a rectangle with a computational complexity of $O(n^3)$. This method will be referred to as Theorem 5.

FIG. 17 illustrates a general method (Theorem 5) for calculating a sum of elements in a rectangle. The question is to calculate a sum of elements within a specific rectangle (rs, re, cs, ce) as part of an n×n two-dimensional array A. As will be explained below, this calculation is performed in a preprocessing time of $O(n^3)$ plus a query time of $O(1)$ The calculation process begins with a preprocessing operation that obtains an accumulated sum array E from the foregoing three-dimensional array D of equation (1). This accumulated sum array E is expressed as follows:

$$E[rs][re][c] = \Sigma_{1 \leq i \leq c} D[rs][re][i] \qquad (5)$$

The accumulated sum array E represents a collection of values obtained by calculating a sum of constant values within a rectangle (rs, re, 1, c) and reversing the sign of that sum. Here the following relationship holds between the two arrays E and D: $E[rs][re][c] = D[rs][re][c] + E[rs][re][c-1]$, where $E[rs][re][0] = 0$. The calculation of accumulated sum array E begins with calculation of three-dimensional array D with a computational complexity of $O(n^3)$, taking advantage of the noted relationship. $E[rs][re][c]$ is then calculated sequentially from c=1 to c=n for each combination of rs and re. The computational complexity of this calculation is $O(n^3)$. In other words, the preprocessing in Theorem 5 is performed with a computational complexity of $O(n^3)$.

Based on the accumulated sum array E obtained above, the following equation gives the sum of constant values in a rectangle (rs, re, cs, ce):

$$\Sigma_{rs \leq r \leq re, cs \leq c \leq ce} A[r][c] = -\Sigma_{cs \leq c \leq ce} D[rs][re][c] =$$
$$-(E[rs][re][ce] - E[rs][re][cs-1]) \qquad (6)$$

This calculation takes advantage of the fact that the sum of elements in a rectangle (rs, re, cs, ce) equals the sum in a rectangle (rs, re, 1, ce) minus the sum in a rectangle (rs, re, 1, cs-1). Since accumulated sum array E is at hand as a result of the preprocessing operation, the sum of constant values in any rectangle can be obtained according to equation (6), with a computational complexity of $O(1)$.

The computation unit 120 uses Theorems 1 to 5 described above to efficiently obtain a set of rectangles representing a row header area, column header area, and numerical value management area in a numerical table. As will be described in detail below, the computation unit 120 has several functions for fast identification of each such area.

Figure 18:
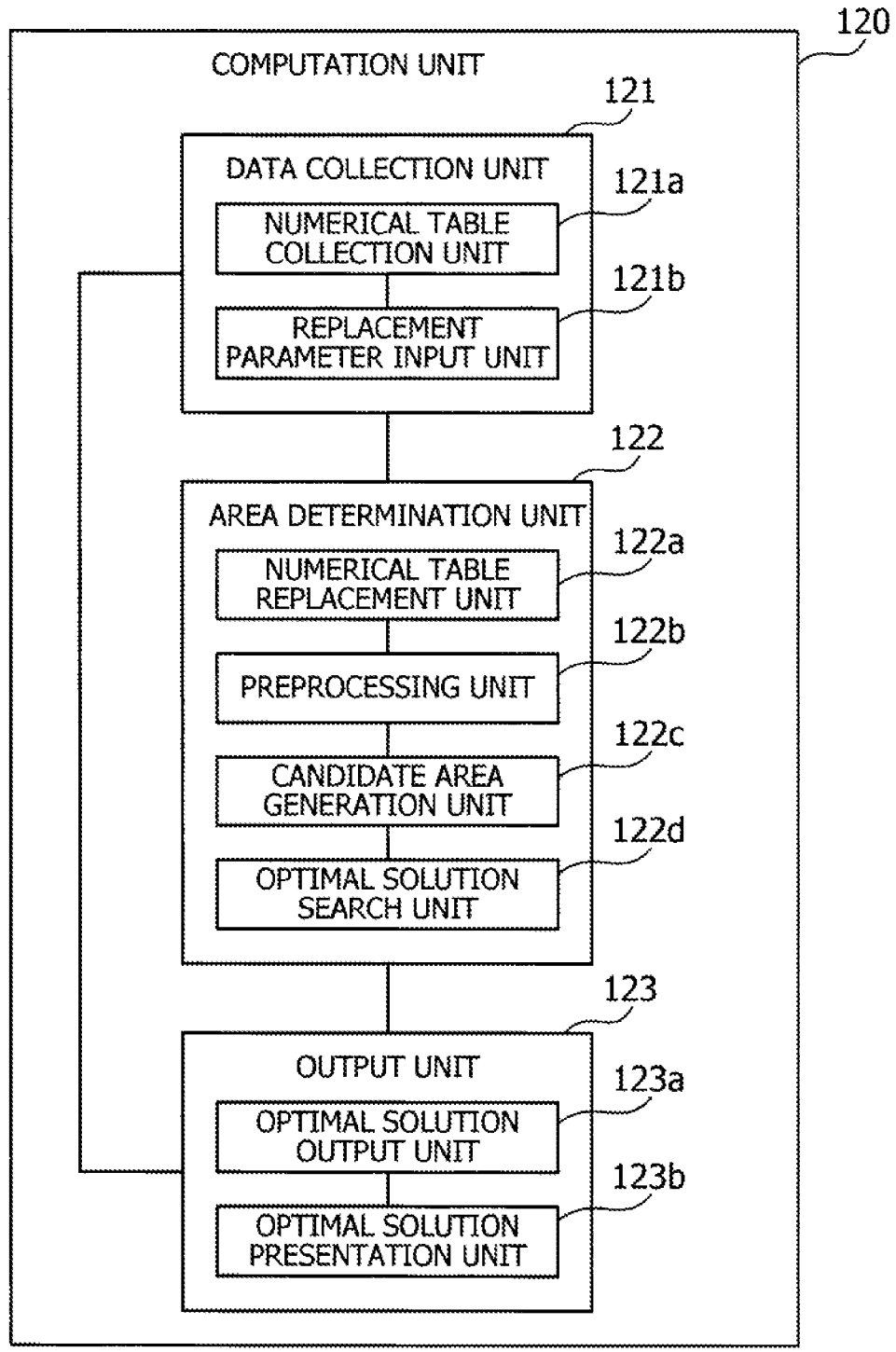
FIG. 18 is a block diagram illustrating details of functions implemented in a computation unit.

FIG. 18 is a block diagram illustrating details of functions implemented in a computation unit. Specifically, the illustrated computation unit 120 includes a data collection unit 121, an area determination unit 122, and an output unit 123.

The data collection unit 121 collects information used for determining distinct areas constituting a numerical table. For example, this data collection unit 121 includes a numerical table collection unit 121*a* and a replacement parameter input unit 121*b*. The numerical table collection unit 121*a* retrieves numerical tables 111, 112, ... out of the storage unit 110. The replacement parameter input unit 121*b* receives parameters for replacement of cell values in the numerical tables 111, 112, .... For example, the replacement parameter input unit 121*b* may receive a value for replacement of character strings in the cells. The replacement parameter input unit 121*b* may also receive those for replacement of numerical values and null values in the cells.

The area determination unit 122 identifies a row header area, a column header area, and a numerical value management area in each given numerical table. For example, the area determination unit 122 is formed from a numerical table replacement unit 122*a*, a preprocessing unit 122*b*, a candidate area generation unit 122*c*, and an optimal solution search unit 122*d*.

The numerical table replacement unit 122*a* replaces the current values in each cell of the numerical tables 111, 112, ... with values specified by replacement parameters.

The preprocessing unit 122b performs preprocessing operations to achieve Theorems 3, 4, and 5 with a computational complexity of O(1).

The candidate area generation unit 122c generates candidates for a numerical value management area in each numerical table 111, 112, . . . . The generated areas are referred to as "candidate numerical areas." The candidate area generation unit 122c also generates candidate areas for row and column header areas by using Theorems 3 and 4, with respect to each candidate numerical area.

The optimal solution search unit 122d calculates scores of all the generated candidate numerical areas in a numerical table and selects a candidate numerical area that exhibits the highest score. The optimal solution search unit 122d outputs this selected candidate numerical area as the numerical value management area of the numerical table. The optimal solution search unit 122d then determines a row header area and a column header area in accordance with the numerical value management area that has just been determined. The optimal solution search unit 122d regards those areas as an optimal solution.

The output unit 123 outputs the result of area determination. For example, the output unit 123 includes an optimal solution output unit 123a and an optimal solution presentation unit 123b. The optimal solution output unit 123a outputs information indicating a row header area, column header area, and numerical value management area determined as an optimal solution. The optimal solution presentation unit 123b generates an image on the monitor 21 to visualize those areas by overlaying rectangles on the numerical table as in FIG. 10.

It is noted that the lines interconnecting the functional blocks in FIG. 18 represent some of their communication paths. The person skilled in the art would appreciate that there may be other communication paths in actual implementations. The functions of each element seen in FIG. 18 may be implemented as their corresponding program modules that a computer executes.

The next section will explain detailed procedures of area determination.

Figure 19:
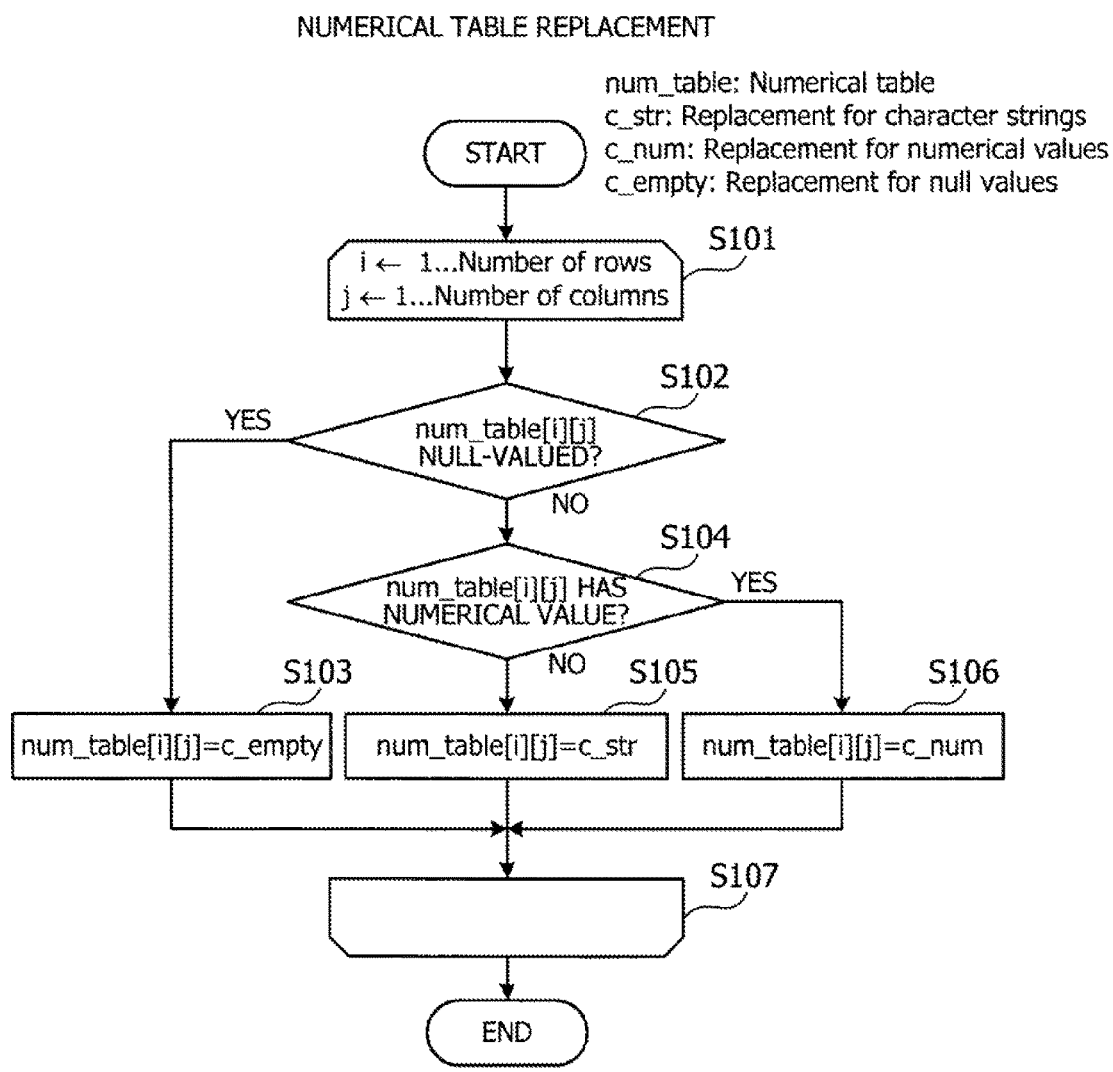
FIG. 19 is a block diagram illustrating an exemplary procedure of numeric table replacement.

FIG. 19 is a block diagram illustrating an exemplary procedure of numeric table replacement. Each operation in FIG. 19 is described below in the order of step numbers, assuming that the procedure is called with some arguments including: num_table (source numerical table in question), c_str (constant value for replacement of character strings), c_num (constant value for replacement of numerical values), and c_empty (constant value for replacement of null values). For example, parameter c_sth may have a value of −2, parameter c_num may have a value of 2, and parameter c_empty may have a value of 0.

(Step S101) Let integer variables i and j indicate a row and a column in a numerical table specified by variable num_table. Variable i may vary from 1 to the number of rows in the numerical table, while variable j may vary from 1 to the number of columns in the same. The numerical table replacement unit 122a executes the following steps S102 to S106 with every possible combination of variables i and j.

(Step S102) The numerical table replacement unit 122a determines whether the cell at the intersection point of i-th row and j-th column (referred to as num_table[i][j]) in the numerical table is a null-valued cell. When it is a null-valued cell, the process advances to step S103. Otherwise, the process advances to step S104.

(Step S103) The numerical table replacement unit 122a enters c_empty to the cell num_table[i][j] of interest. The process then proceeds to step S107.

(Step S104) The numerical table replacement unit 122a determines whether the cell num_table[i][j] contains a numerical value. When the cell contains a numerical value, the process advances to step S106. Otherwise, the process advances to step S105.

(Step S105) The numerical table replacement unit 122a enters c_str to the cell num_table[i][j] of interest. The process then proceeds to step S107.

(Step S106) The numerical table replacement unit 122a enters c_num to the cell (num_table[i][j]) at the i-th row and j-th column. The process then proceeds to step S107.

(Step S107) The numerical table replacement unit 122a exits from the current process of numeric table replacement when all the possible combinations of variables i and j have undergone the above steps S102 to S106.

For example, the above-described process of numerical table replacement converts the numerical table 112 in FIG. 5 to the numerical table 112a in FIG. 6. The converted table is then passed to the preprocessing unit 122b for preprocessing according to Theorems 3, 4, and 5. The preprocessing result is stored in a memory and subjected to a procedure of candidate area generation by the candidate area generation unit 122c.

Figure 20:
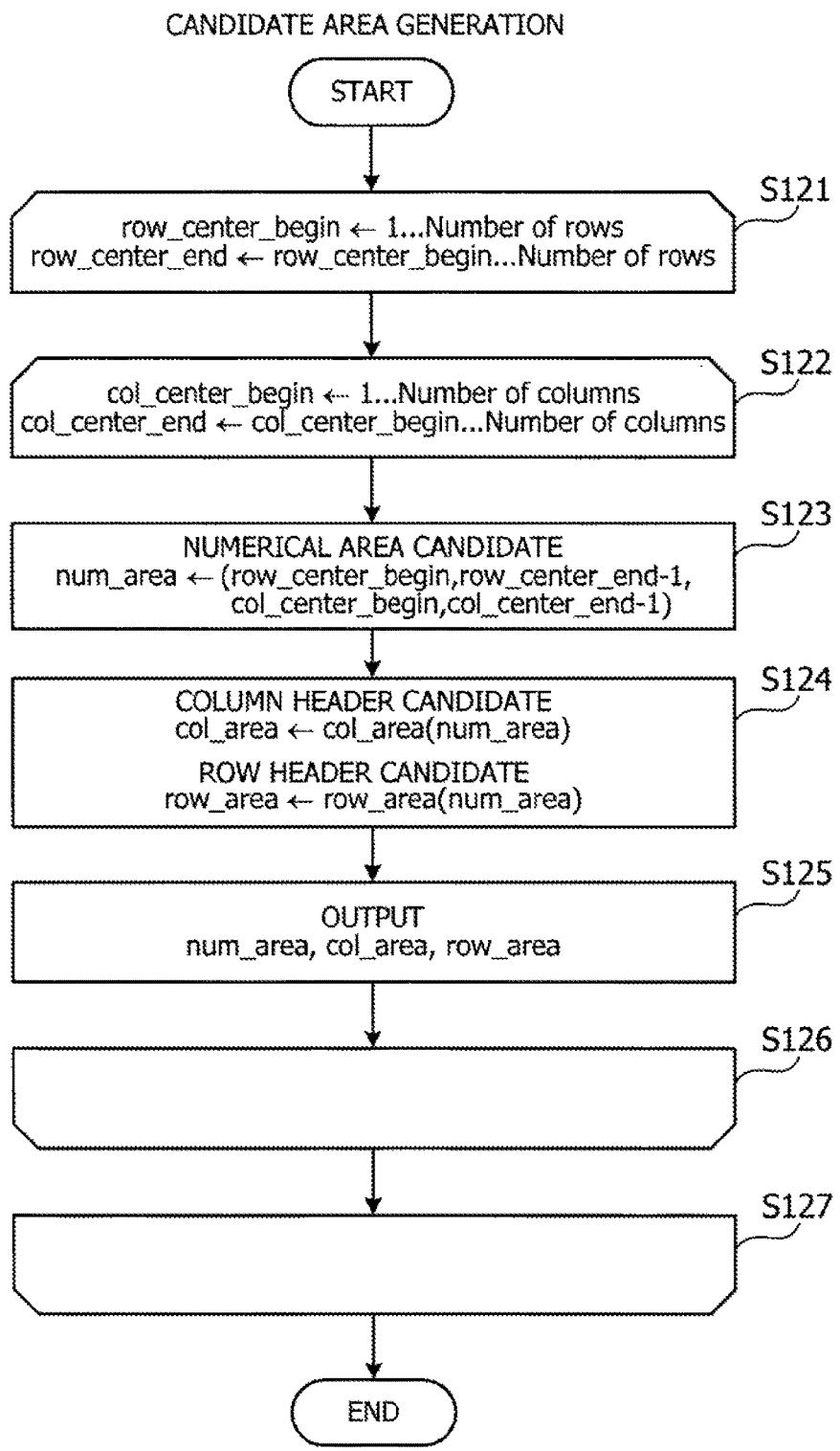
FIG. 20 is a flowchart illustrating an exemplary procedure of candidate area generation.

FIG. 20 is a flowchart illustrating an exemplary procedure of candidate area generation. Each operation in FIG. 20 is described below in the order of step numbers, assuming that the procedure is called with an argument num_table representing a converted version of a numerical table.

(Step S121) Integer variable row_center_begin may vary from 1 to the number of rows in the given table num_table. Integer variable row_center_end may vary from row_center_begin to the number of rows in the same table. The numerical table replacement unit 122a executes the following steps S122 to S126 with respect to each possible combination of variables row_center_begin and row_center_end.

(Step S122) Integer variable col_center_begin may vary from 1 to the number of columns of the table. Integer variable col_center_end may vary from col_center_begin to the number of columns in the table. The numerical table replacement unit 122a executes the following steps S123 to S125 with respect to each possible combination of variables col_center_begin and col_center_end.

(Step S123) The candidate area generation unit 122c assigns (row_center_begin, row_center_end−1, col_center_begin, col_center_end−1) to variable num_area, which represents a numerical area candidate.

(Step S124) Using the numerical area candidate num_area of step S123, the candidate area generation unit 122c calculates row_area(num_area) according to Theorem 3 described in FIG. 15. The candidate area generation unit 122c assigns the resulting row header candidate to variable row_area. This row header candidate, row_area, represents a rectangular area that minimizes the sum of cell values therein and whose right side coincides with the left side of numerical area candidate num_area.

Using the numerical area candidate num_area of step S123, the candidate area generation unit 122c also calculates col_area(num_area) according to Theorem 4 described in FIG. 16. The candidate area generation unit 122c assigns the resulting column header candidate to variable col_area. This column header candidate col_area represents a rectangular area that minimizes the sum of cell values therein and whose bottom side coincides with the top side of numerical area candidate num_area.

(Step S125) The candidate area generation unit 122c combines the numerical area candidate num_area, row header candidate row_area, and column header candidate col_area obtained in steps S123 to S124 into a candidate area dataset.

(Step S126) The candidate area generation unit 122c causes the process to advance to step S127 when the above steps S123 to S125 have been done with all possible combinations of variables col_center_begin and col_center_end.

(Step S127) The candidate area generation unit 122c terminates the current process of candidate area generation when the above steps S122 to S126 have been done with all possible combinations of variables row_center_begin and row_center_end.

The above-described procedure permits the candidate area generation unit 122c to generate as many area candidate datasets as the number of possible numerical area candidates. For example, a function allareas(num_table) may be defined to include all area candidate datasets generated for a specific numerical table num_table. The result is then passed to the optimal solution search unit 112d to execute a process of searching for an optimal solution.

Figure 21:
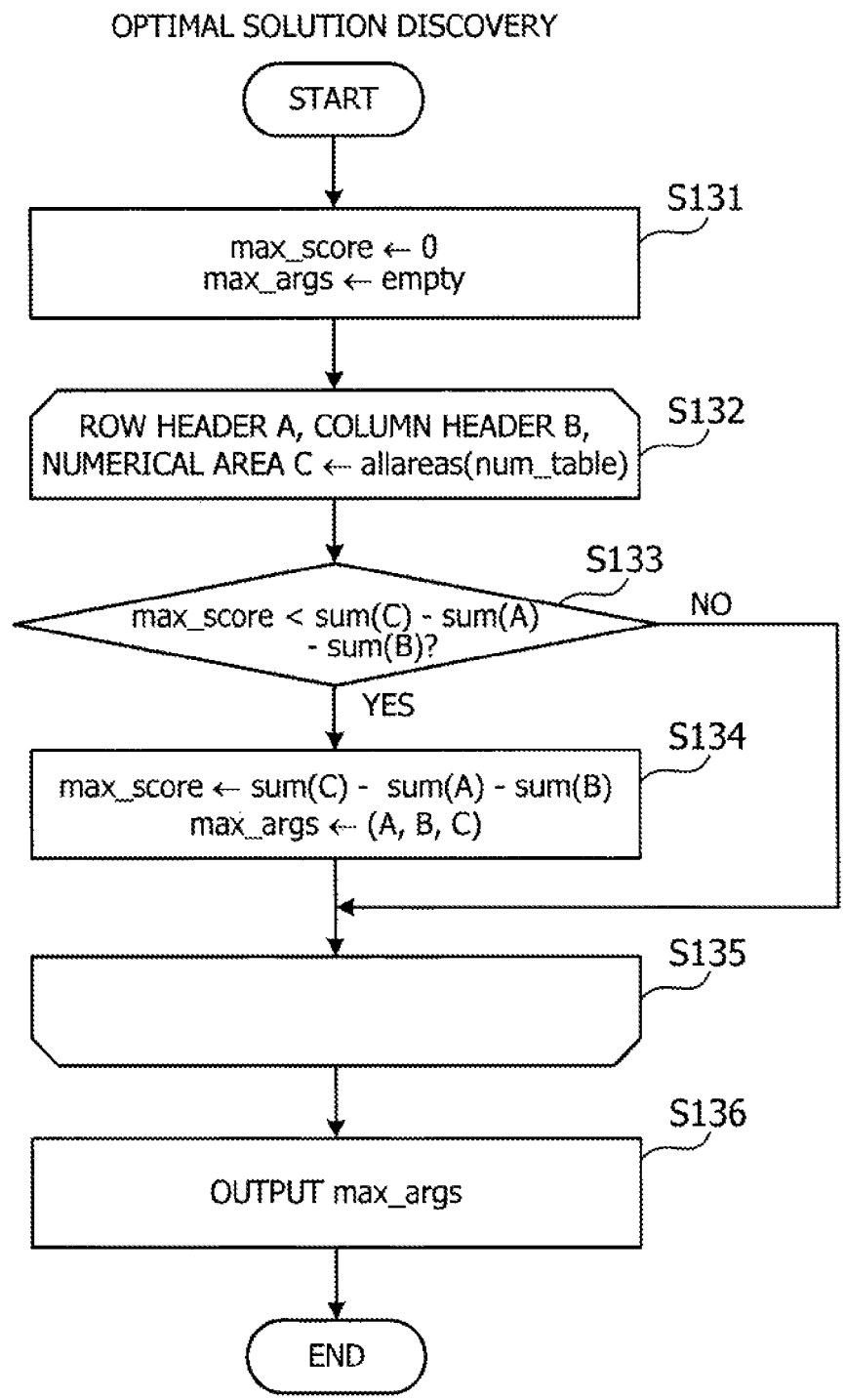
FIG. 21 is a flowchart illustrating an exemplary procedure of optimal solution search.

FIG. 21 is a flowchart illustrating an exemplary procedure of optimal solution search. Each operation in FIG. 21 is described below in the order of step numbers, assuming that the procedure is called with an argument num_table representing a converted version of a numerical table.

(Step S131) The optimal solution search unit 112d assigns a value of zero to variable max_score. The optimal solution search unit 112d also assigns a null value (empty) to variable max_args.

(Step S132) The optimal solution search unit 112d executes the following steps S133 and S134 for each candidate area dataset associated with the given numerical table num_table. Specifically, each candidate area dataset includes three rectangular areas: row_area, col_area, and num_area. The optimal solution search unit 112d assigns row_area as row header rectangle A, col_area as column header rectangle B, and num_area as numerical area rectangle C.

(Step S133) The optimal solution search unit 112d calculates a score (sum(C)−sum(A)−sum(B)) of rectangles specified by the candidate area dataset of interest and determines whether the score exceeds max_score. The sum of constant values in each rectangle can be obtained with a computational complexity of O(1) by taking advantage of the preprocessing according to Theorem 5. If the score exceeds max_score, the process advances to step S134. If the score is equal to or smaller than max_score, the process skips to step S135.

(Step S134) The optimal solution search unit 112d assigns the calculated score to max_score. The optimal solution search unit 112d also updates max_args with the rectangles specified in the current candidate area dataset of interest.

(Step S135) The optimal solution search unit 112d advances the process to step S136 when the above steps S133 and S134 have been done with all the candidate area datasets.

(Step S136) The optimal solution search unit 112d outputs max_args as the search result.

The above-described procedure permits the optimal solution search unit 112d to obtain a score-maximizing set of row header area, column header area, and numerical value management area.

As can be seen from the above, the second embodiment determines proper header areas and numerical value management areas in various numerical tables even if their header areas lack distinction in terms of fonts and indentations. That is, the second embodiment is designed to discover a balanced combination of different rectangles, i.e., a numerical-value-rich numerical value management area and character-string-rich header areas. In other words, the second embodiment enables proper area determination even if the header areas contain some numerical values and the numerical value management area contains some character strings.

The second embodiment also achieves high-speed calculation of scores with effective use of Theorems 1 to 5, thus making it possible to extract header areas and numerical value management areas in a short time. Without Theorems 1 to 5, the computational complexity of an area determination procedure would be $O(n^8)$ when the numerical table has a dimension of n rows and n columns. The use of Theorems 1 to 5 reduces the complexity to $O(n^4)$.

(c) Other Embodiments

The user may be allowed to define constant values for replacement of numerical values and character strings. That is, the replacement for numerical values may be different from the replacement for character strings in terms of their absolute values. For example, numerical values may be replaced with a constant value of 3, and character strings may be replaced with a constant value of −1.

Several embodiments and their variations have been discussed above. In one aspect of those embodiments, the proposed techniques make it possible to extract proper header areas and numerical value management areas even if they contain numerical values and character strings.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A non-transitory computer-readable storage medium storing a program, wherein the program causes processor circuitry in a computer to perform a procedure comprising:
obtaining a table dataset representing a table and storing the obtained table dataset in memory circuitry in the computer, the table having a plurality of cells arranged in rectangular form, at least some of the plurality of cells having numerical values or character strings;
replacing each of the numerical values in the table dataset with a first constant value, and each of the character strings in the table dataset with a second constant value whose sign is opposite to a sign of the first constant value;
generating a plurality of area datasets each including first to third rectangular areas mapped on the plurality of cells, the first rectangular area having a top side and a left side, the second rectangular area having a right side that coincides with the left side of the first rectangular area, the third rectangular area having a bottom side that coincides with the top side of the first rectangular area, the plurality of area datasets respectively including different first rectangular areas;

calculating a difference between a first sum and a second
sum with respect to each of the generated area datasets,
the first sum being a sum of first constant values and
second constant values contained in cells of the first
rectangular area, the second sum being a sum of first
constant values and second constant values contained
in cells of the second rectangular area and in cells of the
third rectangular area;

identifying a difference-maximizing area dataset among
the plurality of area datasets, the difference-maximizing area dataset having a largest difference between the
first sum and the second sum; and outputting the first rectangular area of the difference-maximizing area dataset as a numerical area of the
table, the second rectangular area of the difference-maximizing area dataset as a column header area of the
table, and the third rectangular area of the difference-maximizing area dataset as a column header area of the
table.

2. The non-transitory computer-readable storage medium according to claim 1, wherein the generating includes:

calculating, with respect to individual candidates for a
second rectangular area associated with a determined
first rectangular area, a sum of first constant values and
second constant values in cells, and selecting a candidate for a second rectangular area whose sum of first
and second constant values has a same sign as the
second constant value and exhibits a largest absolute
value of all the candidates for a second rectangular
area;

calculating, with respect to individual candidates for a
third rectangular area associated with a determined first
rectangular area, a sum of first constant values and
second constant values in cells thereof, and selecting a
candidate for a third rectangular area whose sum of first
and second constant values has a same sign as the
second constant value and exhibits a largest absolute
value of all the candidates for a third rectangular area;
and forming an area dataset from the determined first rectangular area, the selected candidate for a second rectangular area, and the selected candidate for a third rectangular area.

3. The non-transitory computer-readable storage medium according to claim 1, wherein:

the replacing includes assigning a third constant value to
empty cells in the table; and the calculating includes calculating a difference between
a sum of first, second, and third constant values in cells
of the first rectangular area and a sum of first, second,
and third constant values in cells of the second rectangular area and in cells of the third rectangular area.

4. A method for extracting areas, comprising:

obtaining a table dataset representing a table and storing
the obtained table dataset in memory circuitry in a
computer, the table having a plurality of cells arranged
in rectangular form, at least some of the plurality of
cells having numerical values or character strings;

replacing, by processor circuitry in the computer, each of
the numerical values in the table with a first constant
value, and each of the character strings in the table with
a second constant value whose sign is opposite to a sign
of the first constant value;

generating, by the processor circuitry, a plurality of area
datasets each including first to third rectangular areas
mapped on the plurality of cells, the first rectangular
area having a top side and a left side, the second
rectangular area having a right side that coincides with
the left side of the first rectangular area, the third
rectangular area having a bottom side that coincides
with the top side of the first rectangular area, the
plurality of area datasets respectively including different first rectangular areas;

calculating, by the processor circuitry, a difference
between a first sum and a second sum with respect to
each of the generated area datasets, the first sum being
a sum of first constant values and second constant
values contained in cells of the first rectangular area,
the second sum being a sum of first constant values and
second constant values contained in cells of the second
rectangular area and in cells of the third rectangular
area;

identifying, by the processor circuitry, a difference-maximizing area dataset among the plurality of area datasets, the difference-maximizing area dataset having a
largest difference between the first sum and the second
sum; and outputting, by the processor circuitry, the first rectangular
area of the difference-maximizing area dataset as a
numerical area of the table, the second rectangular area
of the difference-maximizing area dataset as a column
header area of the table, and the third rectangular area
of the difference-maximizing area dataset as a column
header area of the table.

5. An apparatus for extracting areas, comprising:

memory circuitry that stores a table dataset representing a
table, the table having a plurality of cells arranged in
rectangular form, at least some of the plurality of cells
having numerical values or character strings; and processor circuitry coupled to the memory circuitry and
configured to perform a procedure including:

reading the table dataset out of the memory circuitry;

replacing each of the numerical values in the table with a
first constant value, and each of the character strings in
the table with a second constant value whose sign is
opposite to a sign of the first constant value;

generating a plurality of area datasets each including first
to third rectangular areas mapped on the plurality of
cells, the first rectangular area having a top side and a
left side, the second rectangular area having a right side
that coincides with the left side of the first rectangular
area, the third rectangular area having a bottom side
that coincides with the top side of the first rectangular
area, the plurality of area datasets respectively including different first rectangular areas;

calculating a difference between a first sum and a second
sum with respect to each of the generated area datasets,
the first sum being a sum of first constant values and
second constant values contained in cells of the first
rectangular area, the second sum being a sum of first
constant values and second constant values contained
in cells of the second rectangular area and in cells of the
third rectangular area;

identifying a difference-maximizing area dataset among
the plurality of area datasets, the difference-maximizing area dataset having a largest difference between the
first sum and the second sum; and outputting the first rectangular area of the difference-maximizing area dataset as a numerical area of the
table, the second rectangular area of the difference-maximizing area dataset as a column header area of the table, and the third rectangular area of the difference-maximizing area dataset as a column header area of the table.

\* \* \* \* \*